(12) United States Patent
Watanabe

(10) Patent No.: US 10,086,723 B1
(45) Date of Patent: Oct. 2, 2018

(54) VEHICLE SEAT

(71) Applicant: TS TECH CO., LTD., Asaka-shi, Saitama (JP)

(72) Inventor: Masato Watanabe, Tochigi (JP)

(73) Assignee: TS TECH CO., LTD., Tochigi (JP)

( * ) Notice: Subject to any disclaimer, the term of this patent is extended or adjusted under 35 U.S.C. 154(b) by 0 days.

(21) Appl. No.: 15/474,160

(22) Filed: Mar. 30, 2017

(51) Int. Cl.
*B60N 2/08* (2006.01)
*B60N 2/30* (2006.01)
*B60N 2/07* (2006.01)
*B60N 2/68* (2006.01)

(52) U.S. Cl.
CPC ......... *B60N 2/3097* (2013.01); *B60N 2/0705* (2013.01); *B60N 2/68* (2013.01)

(58) Field of Classification Search
CPC .... B60N 2/0715; B60N 2/0705; B60N 2/073; B60N 2/06; B60N 2/0732; B60N 2/0818; B60N 2/0825; B60N 2/68; B60N 2/07; B60N 2/0707

See application file for complete search history.

(56) References Cited

U.S. PATENT DOCUMENTS

| | | | | |
|---|---|---|---|---|
| 4,204,658 A | * | 5/1980 | Courtois | B60N 2/0705 248/430 |
| 4,526,424 A | * | 7/1985 | Korth | B60N 2/0707 297/473 |
| 4,685,716 A | * | 8/1987 | Kondo | B60R 22/26 248/429 |
| 4,818,022 A | * | 4/1989 | Nishimura | B60N 2/06 280/804 |
| 5,106,144 A | * | 4/1992 | Hayakawa | B60N 2/071 248/429 |
| 5,322,348 A | * | 6/1994 | Johnson | B60N 2/0705 248/430 |
| 5,653,506 A | * | 8/1997 | Wisner | B60N 2/0705 248/429 |
| 5,755,422 A | * | 5/1998 | Susko | B60N 2/0705 248/430 |
| 5,957,535 A | * | 9/1999 | Pasternak | B60N 2/0705 248/429 |
| 6,089,665 A | * | 7/2000 | Andrigo | B60N 2/06 248/424 |

(Continued)

FOREIGN PATENT DOCUMENTS

DE 102014009614 A1 12/2014
FR 2883524 A1 9/2006

(Continued)

*Primary Examiner* — Shin H Kim
(74) *Attorney, Agent, or Firm* — Armstrong Teasdale LLP

(57) ABSTRACT

In a vehicle seat attached to the floor of the vehicle via a rail device and a lock device, the mechanical stiffness of the rail device and the lock device is increased without increasing the overall weight of the vehicle seat and without unduly increasing the manufacturing cost. The vehicle seat further comprises at least one upper hook member (115A) depending from one of the upper rails, and at least one lower hook member (89B) extending upward from a part of the corresponding lock device or a member securing the lock device to a corresponding lower rail such that the upper and lower hook members are spaced apart from each other, but jointly prevent an upward movement of the upper rail away from the lower rail.

8 Claims, 20 Drawing Sheets

(56) References Cited

U.S. PATENT DOCUMENTS

| | | | |
|---|---|---|---|
| 9,180,796 B2* | 11/2015 | Markel | B60N 2/01583 |
| 9,834,116 B2* | 12/2017 | Couasnon | B60N 2/0722 |
| 2010/0327138 A1* | 12/2010 | Yamada | B60N 2/0705 |
| | | | 248/429 |
| 2015/0203011 A1* | 7/2015 | Fujita et al. | B60N 2/68 |
| | | | 297/284.11 |
| 2015/0306998 A1 | 10/2015 | Matsui | |
| 2015/0343932 A1 | 12/2015 | Hosoe | |
| 2015/0352986 A1* | 12/2015 | Fujita et al. | B60N 2/68 |
| | | | 297/216.1 |
| 2016/0176325 A1* | 6/2016 | Fujita et al. | B60N 2/1615 |
| | | | 297/216.17 |
| 2017/0197525 A1* | 7/2017 | Hattori | B60N 2/0705 |
| 2017/0259705 A1* | 9/2017 | Supernavage | B60N 2/07 |
| 2017/0259706 A1* | 9/2017 | Supernavage | B60N 2/07 |
| 2017/0291507 A1* | 10/2017 | Hattori et al. | B60N 2/20 |
| 2017/0313224 A1* | 11/2017 | Akaike et al. | B60N 2/68 |

FOREIGN PATENT DOCUMENTS

| | | |
|---|---|---|
| FR | 3006951 A1 | 12/2014 |
| JP | H10297331 A | 11/1998 |
| JP | 2010143438 A | 7/2010 |
| JP | 2011207257 A | 10/2011 |
| JP | 2016105868 A | 6/2016 |

* cited by examiner

VEHICLE SEAT

TECHNICAL FIELD

The present invention relates to a vehicle seat configured to be installed in a vehicle.

BACKGROUND ART

In the field of vehicle seats, it is known to detachably attach a rear end of a seat cushion to the floor of the vehicle and pivotally attach a front end of the seat cushion to the floor so that the seat may be retracted by folding the seat back onto the seat cushion, and tilting the folded seat forward around the front end of the seat cushion. In a known vehicle seat, a rail device is provided immediately under the seat cushion frame, and the bottom end of the rail device is fitted with a lock device which is configured to detachably engage a striker fixed to the floor of the vehicle. See JP2011-207257A, for instance.

In such a vehicle, the rail device and the lock device are required to have a high level of mechanical stiffness so that the rail device and the lock device may not deform under the inertia force of the seat and the vehicle occupant at the time of a vehicle crash. Therefore, the weight of the seat is undesirably great, and the manufacturing cost of the seat is undesirably high.

SUMMARY OF THE INVENTION

In view of such a problem of the prior art, a primary object of the present invention is to improve a vehicle seat which is attached to the floor of the vehicle via a rail device and a lock device in such a manner that the mechanical stiffness of the rail device and the lock device is increased without increasing the overall weight of the vehicle seat and without unduly increasing the manufacturing cost.

To achieve such an object, the present invention provides a vehicle seat (S), comprising: a seat cushion (S1) including a seat cushion frame (F1), the seat cushion frame including a pair of side frame members (13, 14) extending along either side of the seat cushion; a seat back (S2) attached to a rear part of the seat cushion; a slide rail device (3) including a pair of upper rails (3B) extending in a fore and aft direction and attached to the respective side frame members and a pair of lower rails (3A) slidably supporting the respective upper rails; and a pair of lock devices (112) secured to the lower rails for detachably engaging the respective lower rails to corresponding strikers (8A, 8B) secured to a vehicle floor-side member; the vehicle seat further comprising at least one upper hook member (115A) depending from one of the upper rails or one of the side frame members, and at least one lower hook member (89B) extending upward from a part of the corresponding lock device or a member securing the lock device to the corresponding lower rail such that the upper and lower hook members are spaced apart from each other, but jointly prevent an upward movement of the upper rail away from the lower rail.

According to the present invention, when the cushion frame is moved relative to the floor by an inertial force, the upper hook member and the lower hook member engage each other so that the rail device is prevented from being subjected to any significant loading, and is therefore prevented from deforming. Also, the lock device is restrained by the upper hook member so that the deformation of the lock device is minimized. On the other hand, during normal operation of the rail device, the upper hook member and the lower hook member are spaced apart from each other at all times so that the upper rail and the lower rail can slide relative to each other without causing any significant friction.

Preferably, the upper hook member and the lower hook member are each made of sheet metal, and extend in a fore and aft direction.

According to this arrangement, the stiffness of the upper hook member and the lower hook member can be increased at low cost. During normal operation of the rail device, the upper hook member and the lower hook member are kept in a mutually opposing relationship as the upper hook member and the lower hook member move in the lengthwise direction relative to each other.

In a preferred embodiment of the present invention, each lock device comprises a side wall member which is attached to a lower part of the corresponding lower rail so as to extend downward and provided with a first slot in a lower edge thereof, a cover plate attached to the side wall member via a spacer so as to oppose the side wall member and provided with a second slot opposite to the first slot, and a latch rotatably supported between the side wall member and the cover plate so as to engage the striker when the striker has advanced into the first slot and the second slot, the lower hook member being formed in an upper edge of the cover plate.

According to this arrangement, the structure of the lock device can be simplified, and the lower hook member can be fabricated in a simple manner. The cover plate is directly attached to the lower rail, but, once the rail device is deformed, the cover plate is connected to the upper rail and the side frame member via the upper hook member so that the deformation of the cover plate can be minimized.

In a preferred embodiment of the present invention, the cover plate is connected to the side wall member in at least two points ahead and behind the first slot, respectively, via the spacer.

According to this arrangement, the cover plate can be attached to the side wall member in a stable manner.

Preferably, the side wall member is provided with a through hole, and a free end of the cover plate is bent from a remaining part thereof to be passed into the through hole.

According to this arrangement, because the position of the front end of the cover plate is restricted by the through hole of the side wall member, the position of the cover plate relative to the side wall member can be stabilized even further.

Preferably, the free end of the cover plate which is passed into the through hole engages an outer casing of a control cable for operating the latch.

Thereby, the outer casing can be supported by making use of the front end of the cover plate so that no engagement feature for supporting the outer casing is required to be added to the side wall member.

Preferably, the upper hook member and the lower hook member are J-shaped as seen from front.

Thereby, upper hook member and the lower hook member are prevented from contacting each other while the two hook members move relative to each other along the lengthwise direction of the rail device.

Preferably, the upper end of the upper hook member is interposed between the side frame member and the upper rail.

Thereby, the upper hook member can be connected to both of the cushion side frame and the upper rail in a highly stable manner.

BRIEF DESCRIPTION OF THE DRAWING(S)

DESCRIPTION OF THE PREFERRED EMBODIMENT(S)

An embodiment of the present invention is described in the following with reference to the appended drawings. This embodiment consists of a (second row or third row) rear seat. The left and right directions are defined from the view of an occupant in the seat. As various components of the seat are arranged one either side of the seat in a symmetric arrangement, such mutually symmetric components may be denoted with same numerals, and only the components on one side of the seat may be described in the following disclosure.

(General Structure)

Figure 1:
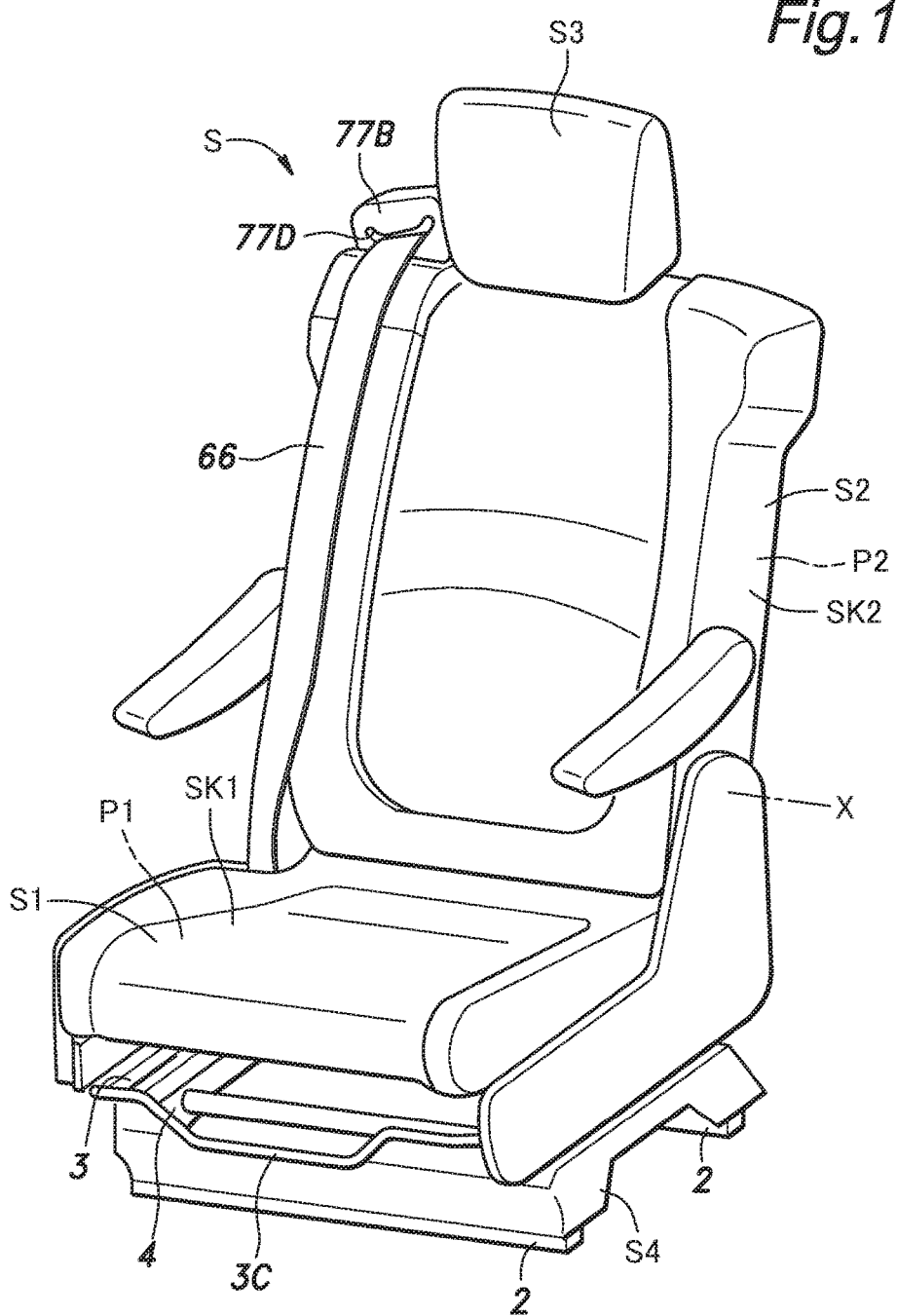
FIG. 1 is a perspective view of a vehicle seat as seen from an upper left direction.
Figure 2:
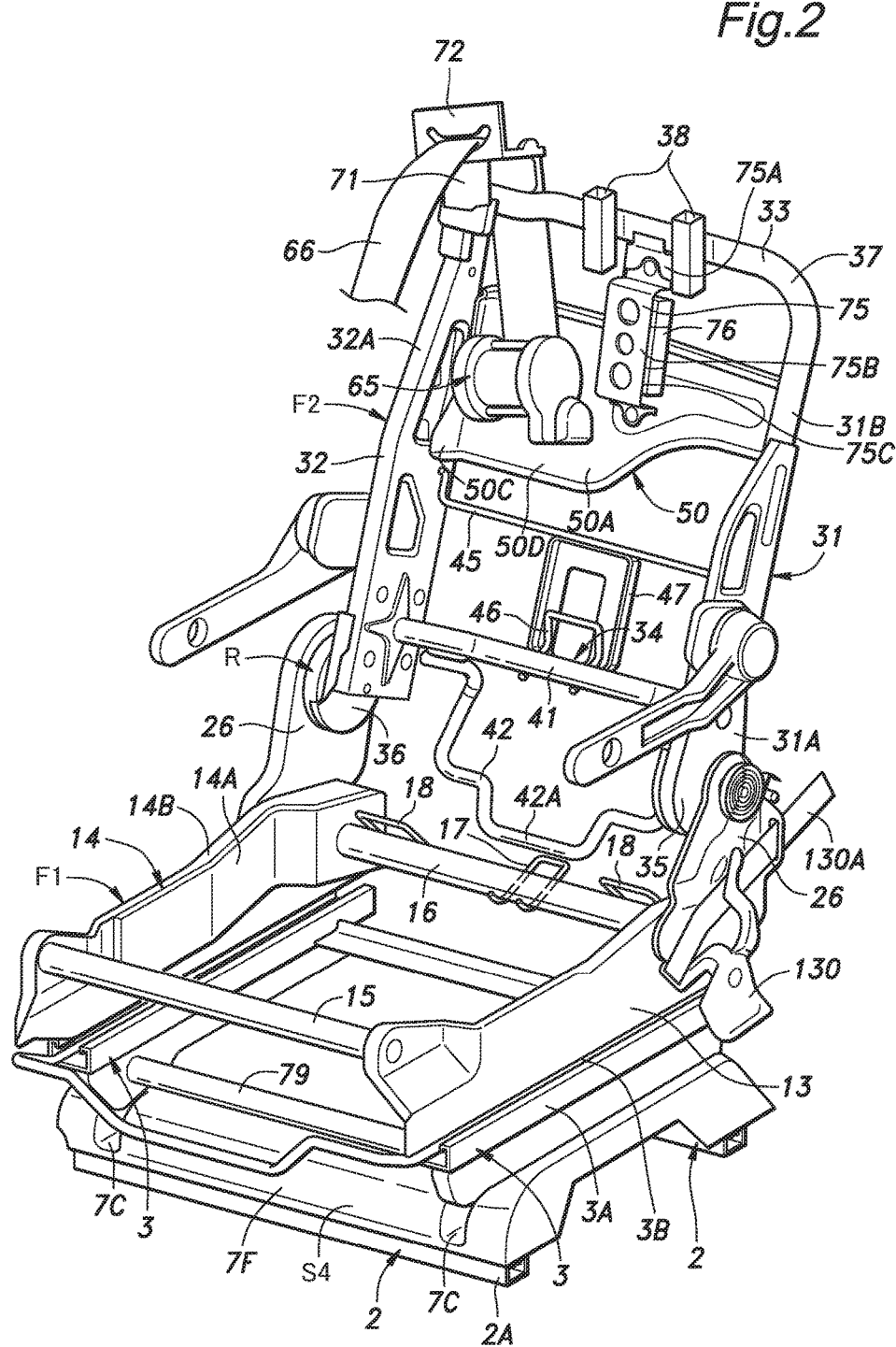
FIG. 2 is a perspective view of a frame of the vehicle seat as seen from an upper left direction.

As shown in FIGS. 1 and 2, the seat S includes a seat cushion S1, a seat back S2 and a head rest S3. The seat cushion S1 is supported by the vehicle floor via a support member named as carrier S4. More specifically, the carrier S4 is supported by the floor via a pair of first rail devices 2 extending laterally so as to be slidable in the lateral direction. The seat cushion S1 is supported by the carrier S4 via a pair of second rail devices 3 extending longitudinally so as to be slidable in the fore and aft direction. A connecting device 4 is interposed between the second rail devices 3 and the carrier S4 so that the second rail devices 3 along with the main part of the seat S may be detached from the first rail devices 2 which are essentially permanently attached to the floor.

Figure 3:
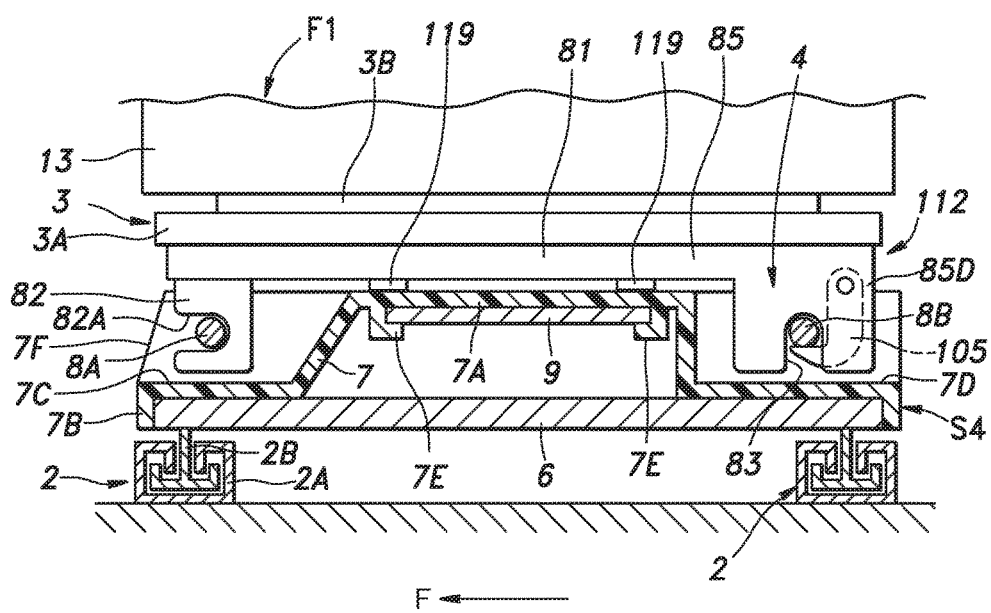
FIG. 3 is a sectional view showing a connecting structure between a second rail device and a base.

As shown in FIG. 3, each first rail device 2 includes a lower rail 2A and an upper rail 2B combined with each other in a slidable manner, and a lock device (not shown in the drawings) for securing the upper rail 2B to the lower rail 2A at selected positions. The lower rail 2A is fixedly attached to the floor while the upper rail 2B is fixedly attached to the carrier S4.

Each second rail device 3 includes a lower rail 3A and an upper rail 3B combined with each other in a slidable manner, and a lock device 3C for securing the upper rail 3B to the lower rail 3A at selected positions. The lower rail 3A is detachably attached to the carrier S4 via the connecting device 4 while the upper rail 3B is fixedly attached to the seat cushion S1.

As shown in FIG. 2, the seat back S2 is connected to the rear end of the seat cushion S1 so as to be tiltable in the fore and aft direction. A reclining mechanism R is provided between the seat cushion S1 and the seat back S2 so that the seat back S2 may be fixed at selected angular positions. The head rest S3 is provided centrally on the upper end of the seat back S2.

(Carrier)

As shown in FIG. 3, the carrier S4 includes a carrier frame 6 connected to the upper rails 2B, and a carrier cover 7 covering the carrier frame 6 from above. The carrier cover 7 is made of plastic material, and includes an upper plate portion 7A having a vertically facing major plane (major surface) and a flange wall 7B depending from the peripheral part of the upper plate portion 7A. A pair of downwardly recessed front reception recesses 7C are formed on frontal lateral parts of the carrier cover 7, and the front ends of the front reception recesses 7C are exposed at the front end of the carrier cover 7. A pair of downwardly recessed rear reception recesses 7D are formed on rear lateral parts of the carrier cover 7, and the rear ends of the rear reception recesses 7D are exposed at the rear end of the carrier cover 7.

A striker 8A in the form of a rod extends across the width of each front reception recess 7C, and a similar striker 8B extends across the width of each rear reception recess 7D.

A reinforcement plate 9 is attached to the lower surface of the central part of the upper plate portion 7A. The reinforcement plate 9 may be made of metallic plate, and is retained on the lower surface of the upper plate portion 7A by L-shaped engagement claws 7E integrally formed in the upper plate portion 7A to engage the peripheral part of the reinforcement plate 9 so that the reinforcement plate 9 may be installed in this position by sliding the reinforcement plate 9 horizontally along the lower surface of the upper plate portion 7A into engagement with the engagement claws 7E.

(Seat Cushion)

As shown in FIG. 1, the seat cushion S1 includes a seat cushion frame F1, a pad P1 placed on the seat cushion frame F1 and a skin member SK1 defining the outer surface of the seat cushion S1. The seat back S2 includes a seat back frame F2, a pad P2 placed on the seat back frame F2 and a skin member SK2 defining the outer surface of the seat back S2. The seat cushion frame F1 and the seat back frame F2 are made by combining metallic plate, pipe and rod members.

As shown in FIG. 2, the seat cushion frame F1 includes a pair of cushion side frame members 13 and 14 extending in the fore and aft direction along either side of the seat cushion frame F1, a front cross frame member 15 extending between front parts of the cushion side frame members 13 and 14 and a rear cross frame member 16 extending between rear parts of the cushion side frame members 13 and 14 so as to define a rectangular frame in plan view. The left cushion side frame member 13 is made of a plate member having a laterally facing major plane. The right cushion side frame member 14 is made by combining a left member 14A and a right member 14B essentially consisting of plate members so as to jointly form a closed cross section. The front cross frame member 15 and the rear cross frame member 16 are both made of pipe members having circular cross sections.

(Rear Cross Frame)

Figure 10:
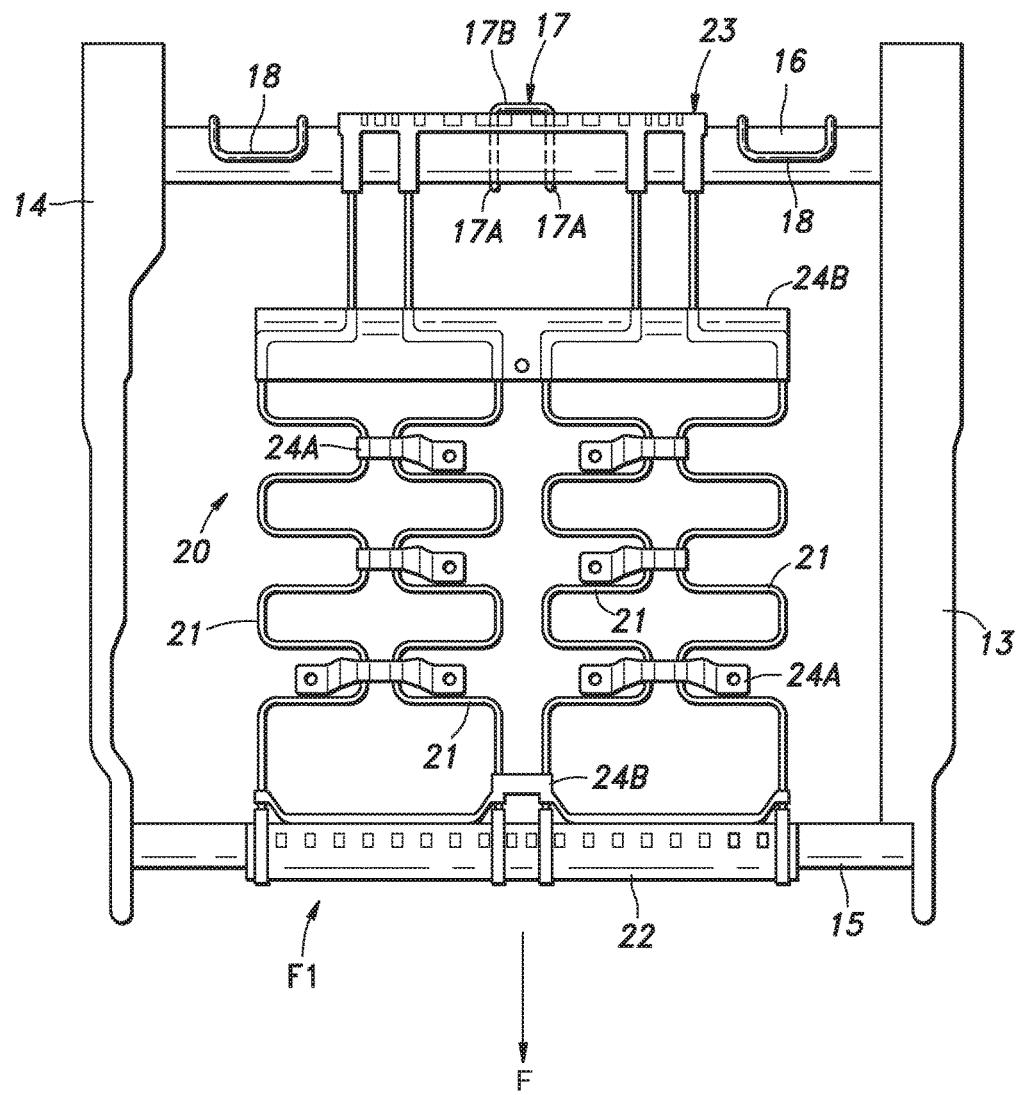
FIG. 10 is a plan view of a seat cushion frame and an occupant support member.

As shown in FIG. 10, a laterally central part of the rear cross frame member 16 is fitted with a tether anchor 17, and both end parts of the rear cross frame member 16 are fitted with lower anchors 18, respectively. The tether anchor 17 is configured to engage a hook provided on the free end of a top tether of a child seat conforming to the ISOFIX standard and placed on the seat S. The lower anchors 18 are configured to engage a pair of connectors extending rearward from the lower parts of the chilled seat, respectively.

The tether anchor 17 is made by bending a metallic rod into the shape of letter U, and is welded to the rear cross frame member 16 at two legs 17A thereof. The two legs 17A of the tether anchor 17 both extend rearward, and are connected to each other by a cross piece 17B at the rear ends thereof. The two legs 17A extend from the lower surface of the rear cross frame member 16 and extends rearward with some upward slant. Similarly, each lower anchor 18 is made by bending a metallic rod into the shape of letter U, and is welded to the rear surface of the rear cross frame member 16 at two legs thereof. The two legs of the lower anchor 18 extend from the rear surface of the rear cross frame member 16 forward in parallel to each other with some upward slant, and are connected to each other by a cross piece at the front ends thereof. The lower anchors 18 are positioned on either side of the tether anchor 17 with a certain lateral spacing defined between each lower anchor 18 and the tether anchor 17.

(Vehicle Occupant Support Member)

As shown in FIG. 10, a vehicle occupant support member 20 for supporting the buttocks of the occupant from below is passed between the front cross frame member 15 and the rear cross frame member 16. The vehicle occupant support member 20 includes a plurality (four in the illustrated embodiment) of spring members 21 extending in the fore and aft direction, a front hook member 22 engaging the front ends of the spring members 21 and wrapped around the outer periphery of the front cross frame member 15, and a rear hook member 23 engaging the rear ends of the spring members 21 and wrapped around the outer periphery of the rear cross frame member 16. Each spring member 21 may consist of an S spring made of metallic material and snaking in a horizontal plane so that the spring members 21 jointly define a horizontal support surface. The front hook member 22 is made of plastic material, and insert molded with the front ends of the spring members 21. The front hook member 22 extends laterally, and is given with a semi-circular cross section with the open side facing downward. The front end of each spring member 21 may be curved in an arcuate fashion so as to extend circumferentially inside the front hook member 22. The front hook member 22 is hooked onto a laterally central part of the front cross frame member 15 so as to extend circumferentially from an upper side of the front cross frame member 15 to a front side thereof so as to be prevented from moving rearward with respect to the front cross frame member 15.

Figure 11:
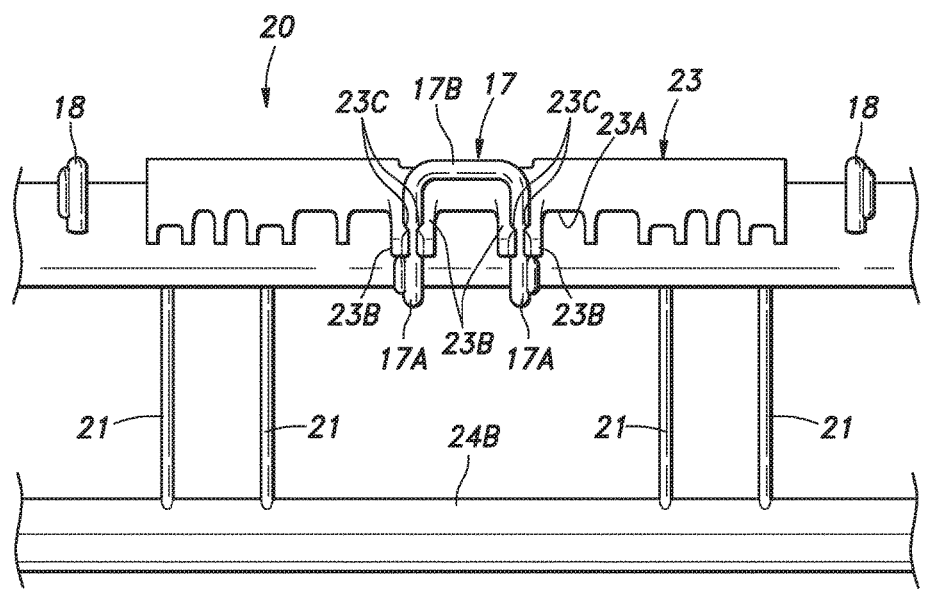
FIG. 11 is a rear view of the occupant support member.
Figure 12:
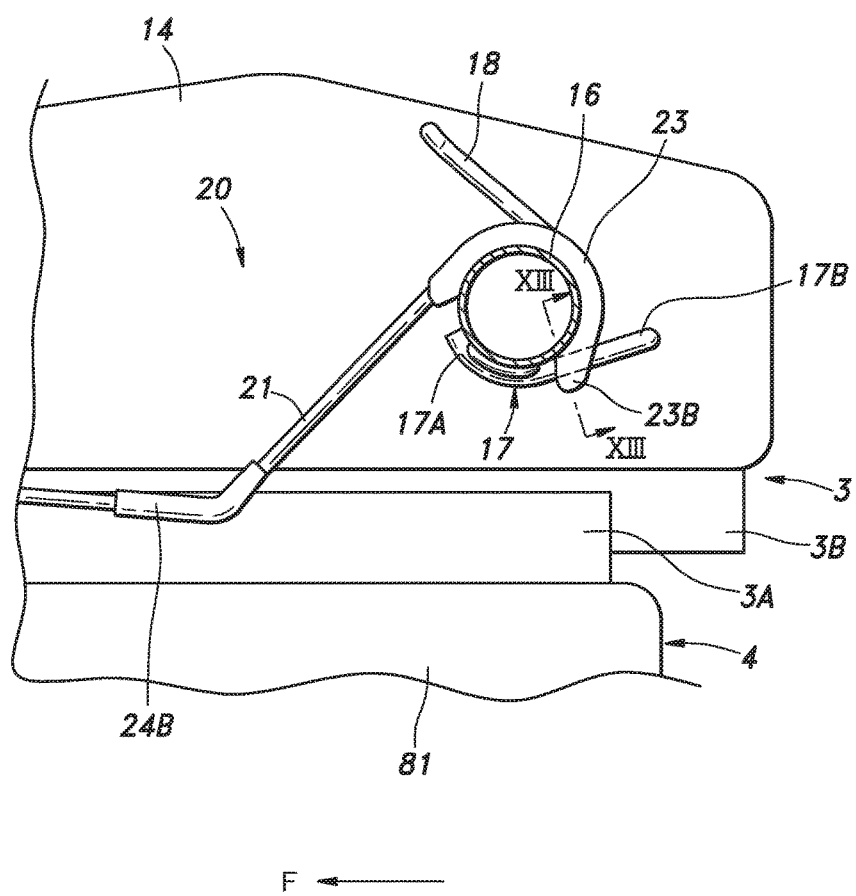
FIG. 12 is a side view of a rear hook member of the occupant support member.
Figure 13:
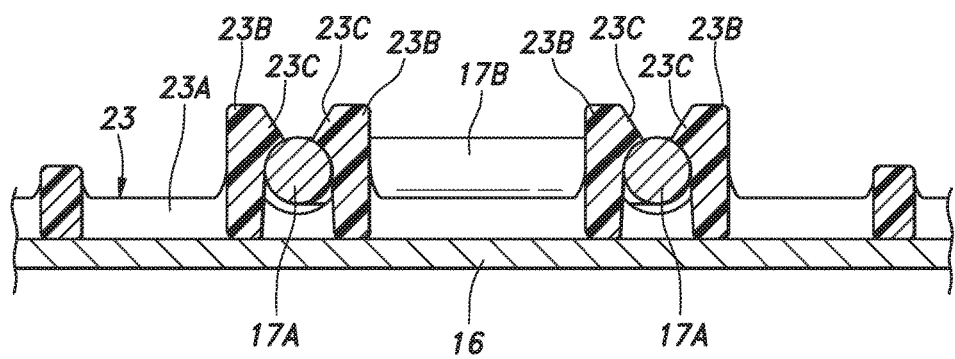
FIG. 13 is a sectional view taken along line XIII-XIII of FIG. 12.

The rear hook member 23 is made of plastic material, and insert molded with the rear ends of the spring members 21. As shown in FIGS. 11 and 12, the rear hook member 23 extends laterally, and is given with a semi-circular cross section with the open side facing downward. The rear end of each spring member 21 may be curved in an arcuate fashion so as to extend circumferentially inside the rear hook member 23. The rear hook member 23 is hooked onto a laterally central part of the rear cross frame member 16 so as to extend circumferentially from an upper side of the rear cross frame member 16 to a rear side thereof so as to be prevented from moving forward with respect to the rear cross frame member 16. The rear hook member 23 is positioned between the two lower anchors 18. In the illustrated embodiment, the lateral ends of the rear hook member 23 are spaced from the respective lower anchors 18. The rear end 23A of the rear hook member 23 is provided with a pair of engagement claws 23B that engage the respective legs 17A of the tether anchor 17 with or without gap.

Each engagement claw 23B extends downward from the rear end 23A of the rear hook member 23, and is provided with a pair of projections 23C that oppose each other, and clamp the corresponding leg 17A of the tether anchor 17 from both sides. Owing to this clamping action of the projections 23C of the engagement claws 23B, the rear hook member 23 can be kept fixed to the rear cross frame member 16 in a secure manner.

As shown in FIG. 10, a plurality of connecting members 24A and 24B are connected laterally between adjoining pairs of the spring members 21 so as to restrict the relative movements between the spring members 21. Each connecting member 24A and 24B may consist of a clip or the like that can be snap fitted to the spring members 21. The connecting members 24A and 24B may also be made of plastic material that is insert molded with the spring members 21. The connecting members 24A and 24B may be provided between the adjoining parts of the spring members 21.

Alternatively, the lateral length of the rear hook member 23 may be such that the lateral ends of the rear hook member 23 abut the respective lower anchors 18. In this case, the rear hook member 23 is clamped between the lower anchors 18 for both sides so that the rear hook member 23 is positively prevented from moving sideways.

(Connecting Device)

Figure 14:
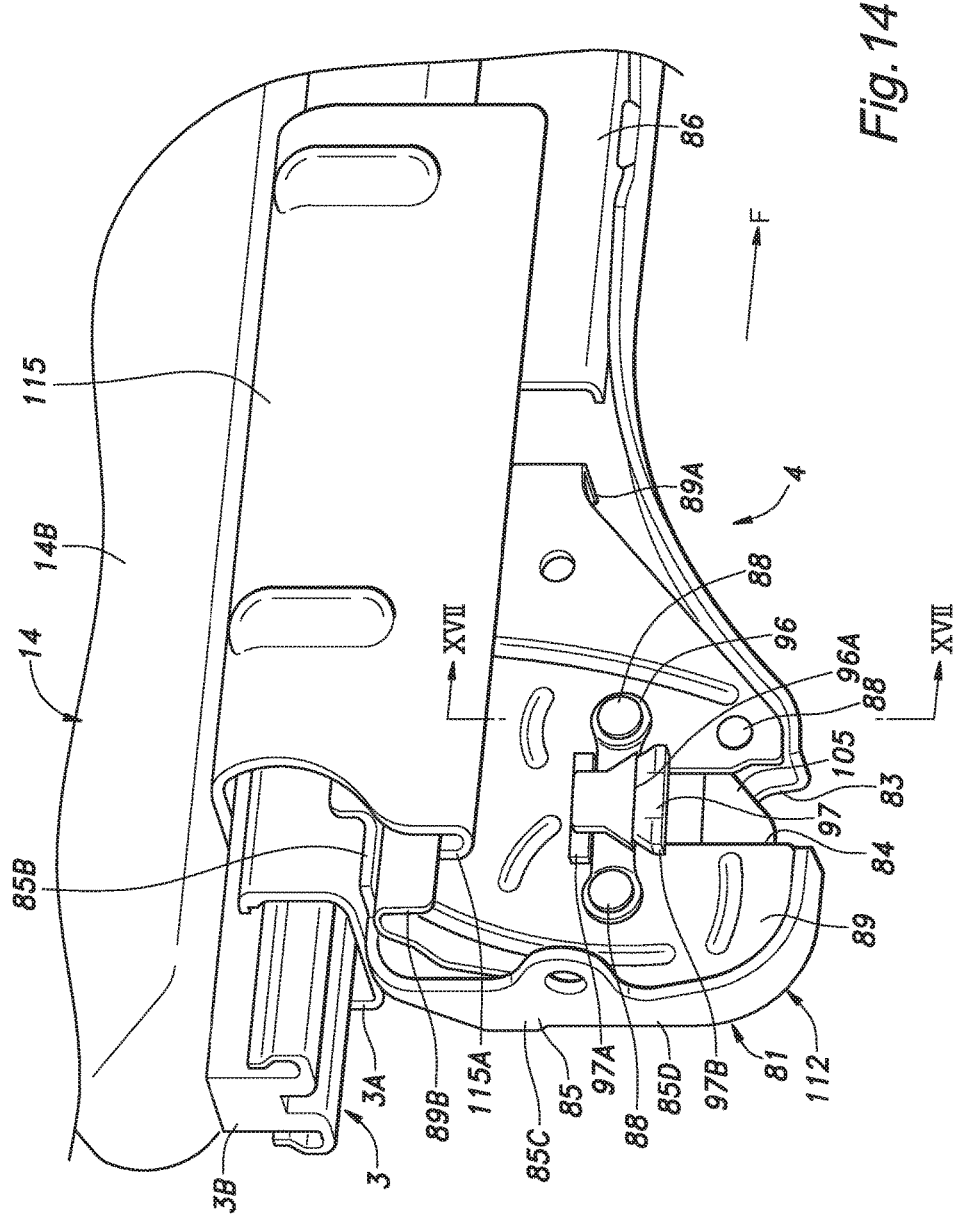
FIG. 14 is a perspective view of a right connecting device as seen from a right and rear direction.
Figure 15:
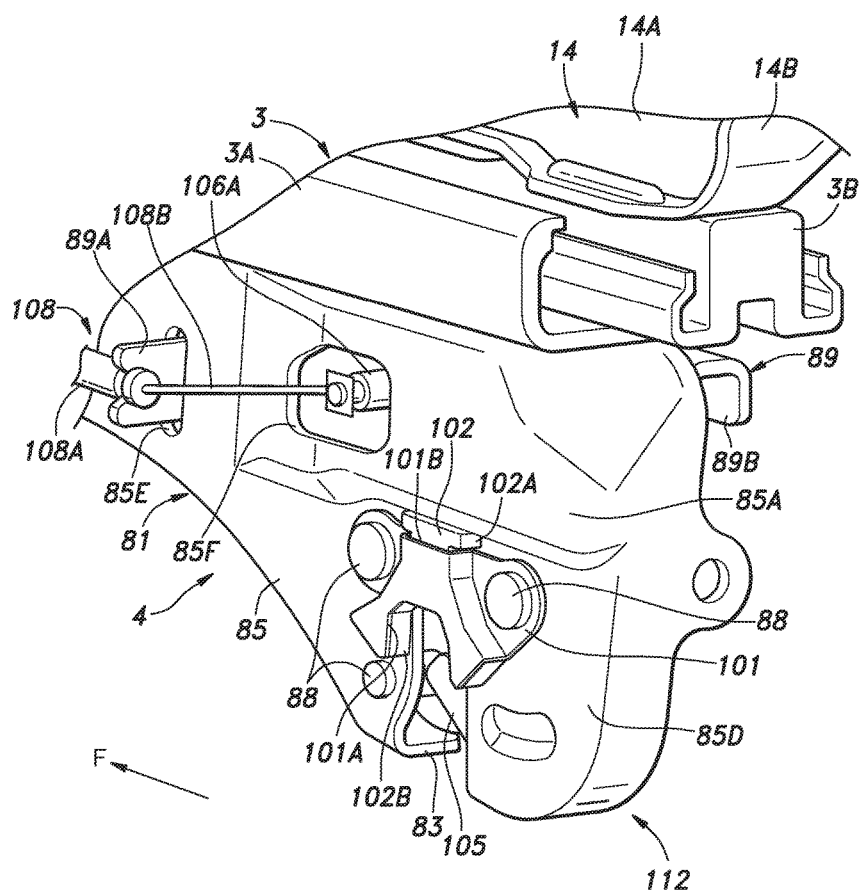
FIG. 15 is a perspective view of the right connecting device as seen from a left and rear direction.

As shown in FIGS. 3, 14 and 15, the connecting device 4 includes a pair of base frames 81 each connected to the lower surface of the lower rail 3A of the corresponding second rail device 3, a pair of hooks 82 provided on the front ends of the respective base frames 81, and a pair of lock devices 112 provided on the rear ends of the respective base frames 81. Each base frame 81 includes a main piece 85 located on the inner side thereof and a sub piece 86 located on the outer side thereof. The main piece 85 includes a side wall 85A defining a laterally facing major plane and extending in the fore and aft direction, an upper wall 85B projecting laterally outward from the upper edge of the side wall 85A and extending along the upper edge of the side wall 85A, and an end wall 85C extending laterally outward from the front, lower and rear edges of the side wall 85A. The sub piece 86 is formed as a channel member having an open side facing laterally inward, and is positioned on the outer side of a front part of the main piece 85. The main piece 85 and the sub piece 86 are made of metallic plate members, and are joined to each other by welding. The side wall 85A, upper wall 85B and end wall 85C of the main piece 85, and the sub piece 86 jointly define a closed cross section. Each base frame 81 is attached to the lower surface of the corresponding lower rail 3A by fasteners such as rivets or by welding.

The front ends of the two base frames 81 are connected to each other by a connecting member 79 extending laterally.

As shown in FIG. 3, each hook 82 is made of a plate member having a laterally facing major plane. The upper part of the hook 82 is interposed between a front part of the side wall 85A of the main piece 85 and the sub piece 86, and fixedly secured to the main piece 85 and the sub piece 86 by using fasteners such as nuts and bolts. The lower part of the hook 82 extends downward beyond the base frame 81. The front edge of the lower part of the hook 82 is formed with a hook slot 82A which is recessed rearward.

A lower rear end part of the main piece 85 is provided with a downwardly projecting projection 85D. A cover plate 89 is attached to the laterally outward side of the projection 75D via a plurality of fastening members 88 serving also as spacers. The cover plate 89 substantially aligns with the upper wall 85B and the projecting end of the end wall 85C in the lateral direction. Thereby, an internal space is defined between the main piece 85 and the cover plate 89. The front end 98A of the cover plate 89 is bent toward the side wall 85A substantially at a right angle, and is passed through a first insertion hole 85E formed in the side wall 85A so as to project inward beyond the side wall 85A. The first insertion hole 85E is elongated in the vertical direction so as to conform to the front end 89A.

The lower edge of the projection 85D of the main piece 85 is formed with a slot 83 extending upwardly from the lower edge thereof, and the lower edge of the cover plate 89 is also formed with an upwardly extending slot 84. These slots 83 and 84 are substantially conformal to each other in side view, and are aligned with each other in the lateral direction. These slots 83 and 84 are located between a pair of the fastening members 88 mentioned earlier with respect to the fore and aft direction.

As shown in FIG. 14, a first cushion material holder 96 is provided on the outer side of the cover plate 89 immediately above the slot 84, and supports a first cushion material 97. The first cushion material holder 96 extends in the fore and aft direction above the slot 84, and is attached to the outer side surface of the cover plate 89 at the front and rear ends thereof by using the respective fastening members 88. The first cushion material holder 96 is spaced from the outer side surface of the cover plate 89 at a part thereof located adjacent to the upper end of the slot 84 so as to define a retaining hole 96A extending vertically and opening outer in both the upper and lower ends thereof in cooperation with the cover plate 89. The lower part of the retaining hole 96A progressively widens in the fore and aft direction toward the lower end thereof. The first cushion material 97 is made of cushioning material such as rubber and elastomer, and is retained in the retaining hole 96A while the upper and lower ends of the first cushion material 97 project upward and downward, respectively, from the retaining hole 96A. The first cushion material 97 is provided with an upper engagement portion 97A that projects sideways and extends in the forward and rearward direction, and a lower engagement portion 97B that projects in the forward and rearward direction and/or sideways. In the illustrated embodiment, the upper engagement portion 97A consists of a projection projecting in the forward and rearward directions from the upper end of the first cushion material 97, and is engaged by the upper edge of the first cushion material holder 96 (or the upper opening of the retaining hole 96A). The lower engagement portion 97B consists of a projection projecting in the laterally outward direction (away from the cover plate 89) from the lower end of the first cushion material 97, and is engaged by the lower edge of the first cushion material holder 96 (or the lower opening of the retaining hole 96A). The lower end of the first cushion material 97 is located slightly below the upper end of the slot 84.

As shown in FIG. 15, a second cushion material holder 101 is attached to the outer side surface of the side wall 85A, and extends above and across the upper end of the slot 83, and retains a second cushion material 102. The second cushion material holder 101 extends in the fore and aft direction across an upper part of the slot 83, and is secured to the outer side surface of the side wall 85A at the front and rear ends thereof by the fastening members 88. The part of the second cushion material holder 101 corresponding to the slot 83 is formed with a slot 101A extending upward from the lower edge of the second cushion material holder 101. The second cushion material holder 101 is spaced apart from the outer side surface of the side wall 85A in a part thereof corresponding to the slot 83, and defines a retaining hole 101B in cooperation with the side wall 85A, the retaining hole 102B extending vertically and having an open upper end and open lower end. The lower part of the retaining hole 101B flares in the fore and aft direction toward the lower end thereof. The second cushion material 102 is made of cushion material such as rubber and elastomer, and is retained in the retaining hole 101B in such a manner that the upper end of the second cushion material 102 protrudes from the upper end of the retaining hole 101B. The second cushion material 102 has an engagement portion 102A at an upper end thereof, the engagement portion 102A projecting in the fore and aft direction and/or laterally outward so as to engage the upper end of the second cushion material holder 101 (the upper opening of the retaining hole 102B). The lower end of the second cushion material 102 flares in the fore and aft direction toward the lower end thereof in conformity with the second cushion material holder 101. Thus, the second cushion material 102 is prevented from moving upward, laterally or sideways relative to the second cushion material holder 101 by the lower part of the second cushion material 102 being engaged by the inner surface of the second cushion material holder 101. The second cushion material 102 is provided with a slot 102B slightly smaller than the slot 83 in a part thereof corresponding to the slot 83 so that the edge of the slot 102B of the second cushion material 102 projects slightly into the slot 83 in side view.

Figure 16:
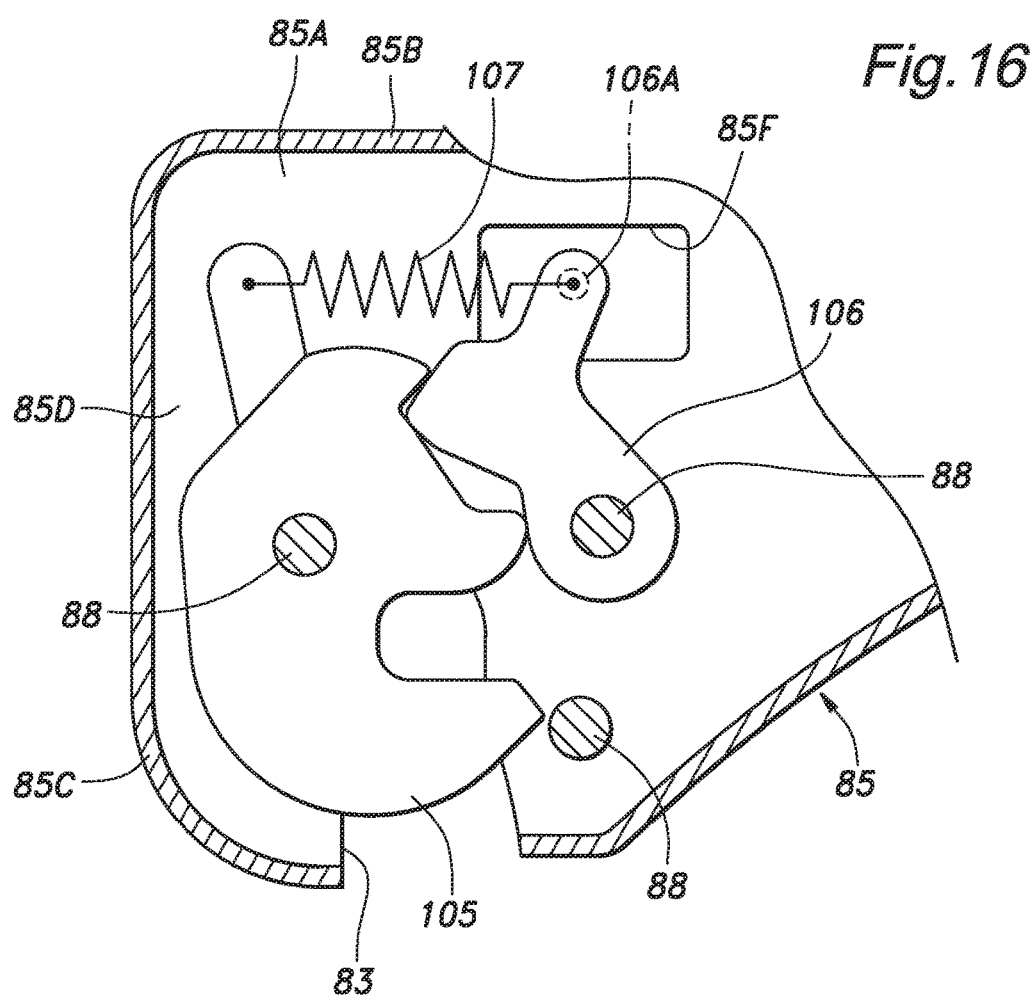
FIG. 16 is a diagram showing the structure of a lock device.

As shown in FIG. 16, a latch 105 rotatably supported by the projection 85D and the cover plate 89 via one of the fastening members 88 is positioned in the space defined between the projection 85D and the cover plate 89. The latch 105 is rotatable around a rotational center line extending laterally through the corresponding fastening member 88 behind the slot 83 between a lock position where the latch 105 projects into a lower part (open end part) of the slot 83 and a release position where the latch 105 withdrawn behind the slot 83. A lock piece 196 is rotatable around a rotational center line extending laterally through the corresponding fastening member 88 positioned in front of the slot 83. The lock piece 196 can rotate between a first position where the lock piece 196 restricts the latch 105 in the lock position from rotating and a second position where the lock piece 196 is disengaged from the latch 105, and allows the latch 105 to rotate freely. The latch 105 and the lock piece 106 are connected to each other via a biasing member 107 such as a tension coil spring so that the lock piece 106 is urged toward the first position and the latch 105 to the lock position. More specifically, the latch 105 is provided with a cam surface by which the latch 105 is pushed toward the lock position by the lock piece 106 moving toward the first position.

As shown in FIGS. 15 and 16, the lock piece 106 is provided with a connecting piece 106A which is passed through a second insertion hole 85F formed in the side wall 85A, and projects outward from the side wall 85A. To the free end of the connecting piece 106A is connected an end of an inner cable 108B of a control cable 108. The outer casing 108A of the control cable 108 is connected to the front end 89A of the cover plate 89 which is passed through the first insertion hole 85E, and projects out of the side wall 85A.

Figure 18:
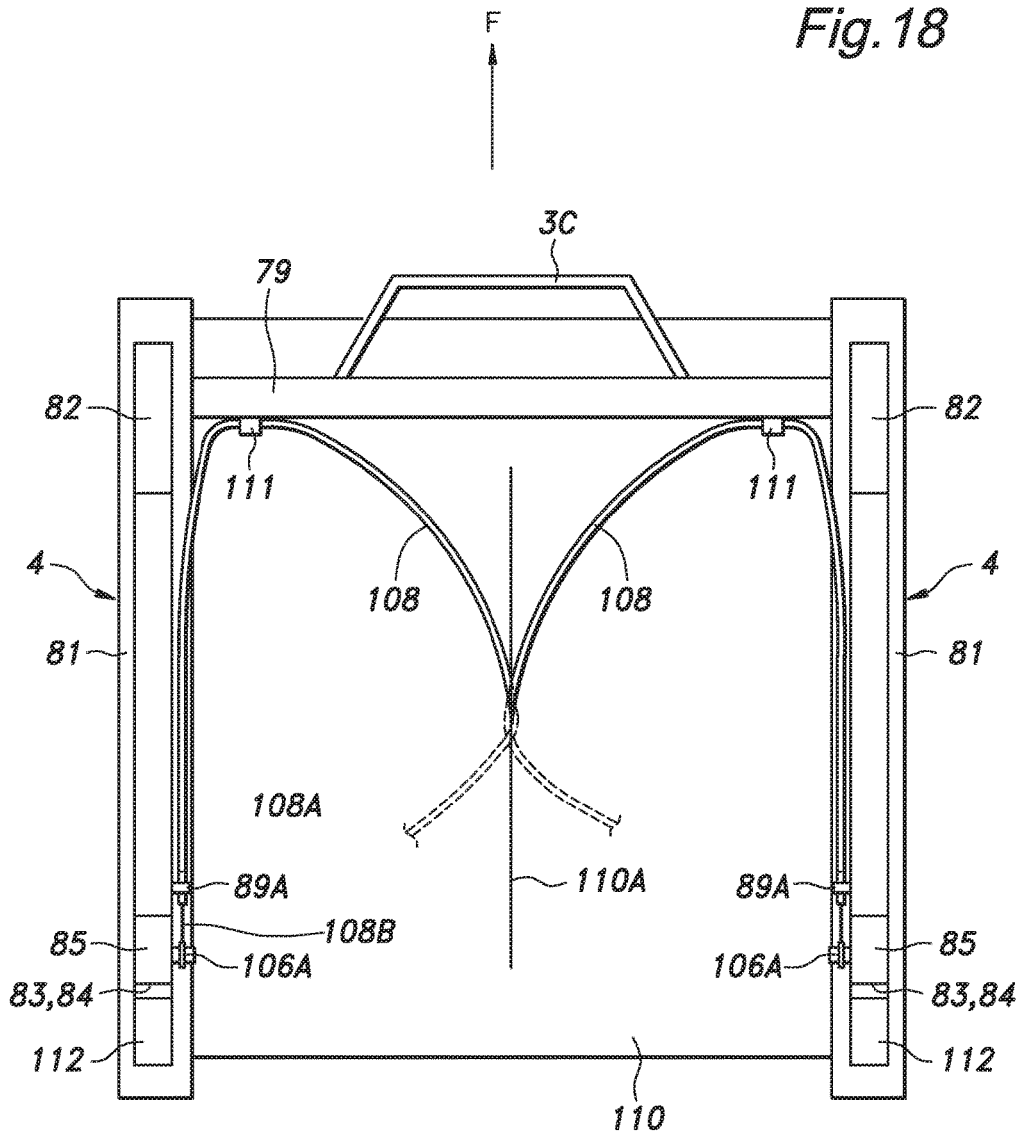
FIG. 18 is a bottom view of the vehicle seat.

As shown in FIG. 18, a lower part of the seat cushion frame F1 is provided with a bottom cover 110 that extends across a square space defined by the cushion side frame members 13 and 14, the front cross frame member 15 and the rear cross frame member 16. The bottom cover 110 may be made of non-woven fabric, or may be made integrally with the skin member SK1. A central part of the bottom cover 110 is formed with a slit 110A extending in the fore and aft direction. The control cable 108 extends from the one end thereof connected to the front end 89A of the cover plate 89 in the forward direction to a part adjoining the connecting member 79, and is bent back rearward into the seat cushion S1 via the slit 110A. Because the slit 110A extends in the fore and aft direction, the movement of the control cable 108 caused by the relative movement between the seat cushion S1 and the connecting device 4 in the fore and aft direction via the second rail devices 3 is enabled without any resistance. A part of the control cable 108 extending below the bottom cover 110 is engaged by a part of the connecting member 79 via a plastic clip 111 that is fitted to the connecting member 79 and provided with a hook for engaging the control cable 108.

The control cable 108 is passed through the seat cushion S1, and the other end of the inner cable 108B is connected to a lock release lever (not shown in the drawings) supported by the cushion side frame member 13. When the lock release lever is at an initial position, the lock piece 106 is in the first position, and the latch 105 is in the lock position. When the lock release lever is at an operation position, the lock piece 106 is placed in the second position, and the latch 105 is in the release position, against the biasing force of the biasing member 107. The projection 85D, the cover plate 89, the latch 105 and the lock piece 106 form a lock device 112.

Figure 17:
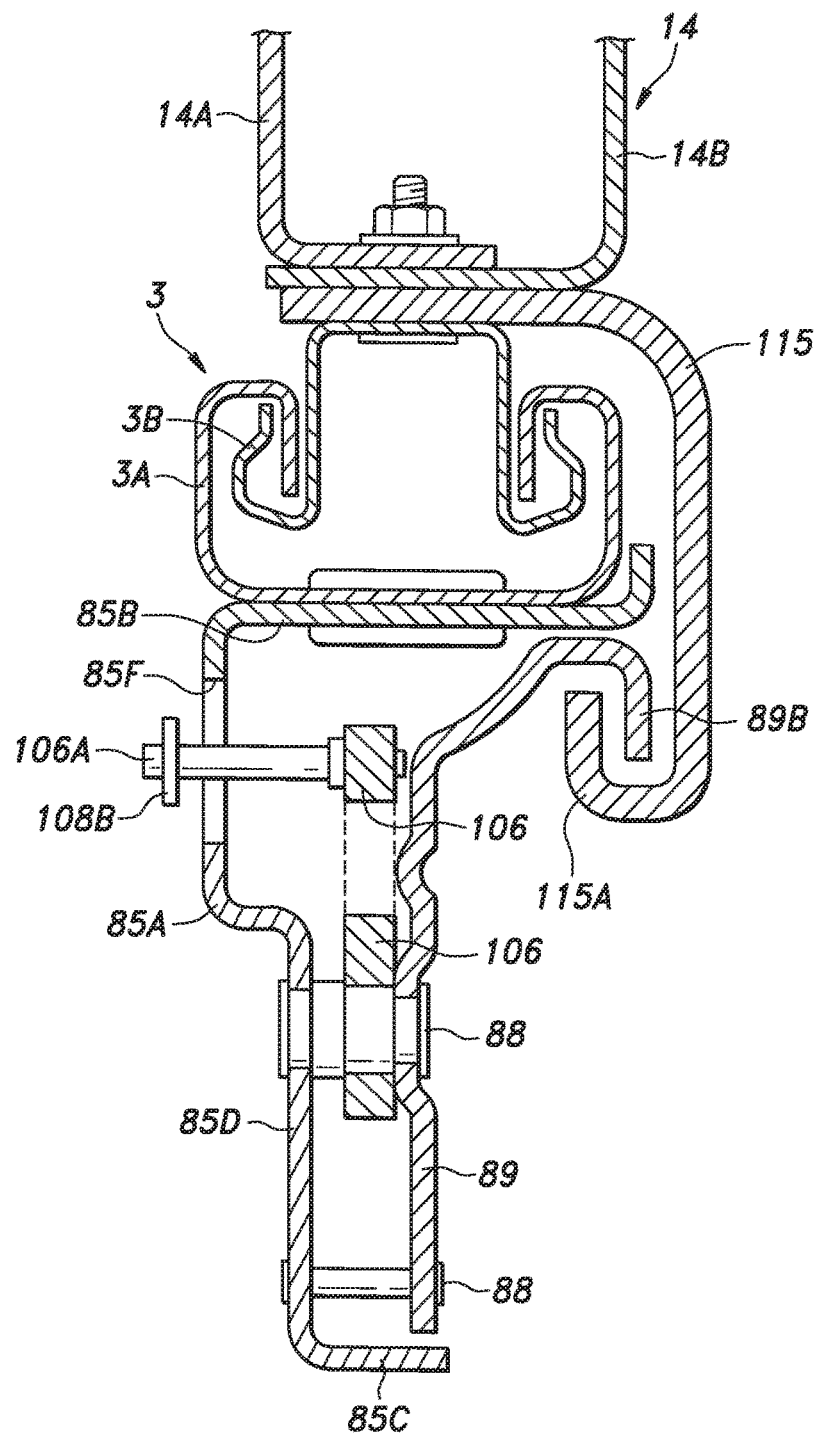
FIG. 17 is a sectional view taken along line XVII-XVII of FIG. 14.

As shown in FIGS. 14 and 17, the upper end of the cover plate 89 is formed as a lower hook portion 89B which is bent away from the side wall 85A and then downward. In other words, the cover plate 89 serves as a lower hook member provided with the lower hook portion 89B. An upper hook member 115 is connected to at least one of the cushion side frame members 13 and 14 and the associated upper rail 3B. The upper hook member 115 is made of stamp formed sheet metal, and extends downward from the corresponding cushion side frame member 13, 14 or the associated upper rail 3B. The lower end of the upper hook member 115 is provided with an upper hook portion 115A extending upward. The upper hook portion 115A of the upper hook member 115 and the lower hook portion 89B oppose each other defining a certain gap in such manner that a certain relative vertical movement between the upper hook portion 115A and the lower hook portion 89B is permitted, but once the relative vertical movement between them exceed a certain distance, the two parts become engaged with each other, and no further relative movement in the vertical direction is permitted. In the illustrated embodiment, the upper end of the upper hook member 115 is interposed between the cushion side frame member 14 and the upper rail 3B of the corresponding second rail device, and is fixedly attached to these two parts by using fasteners such as rivets and bolts or by welding. The upper hook member 115 extends from the upper end thereof in a laterally outward direction, and is bent downward. The downwardly extending part of the upper hook member 115 extends along a laterally outer side of the second rail device 3, and terminates at the upper hook portion 115A.

The upper hook portion 115A and the lower hook portion 89B are each given with a shape of letter J (hairpin shape). The free end of the upper hook portion 115A is received in an inner space of the lower hook portion 89B, and the free end of the lower hook portion 89B is received in an inner space of the upper hook portion 115A. The upper hook portion 115A and the lower hook portion 89B both extend in the fore and aft direction, and maintain the vertically opposing condition even when the upper rail 3B and the lower rail 3A of each second rail device 3 move relative to each other.

As shown in FIG. 3, the connecting device 4 and the carrier S4 are connected to each other by engaging the hooks 82 with the respective front strikers 8A and the two lock device 112 with the respective rear strikers 8B. More specifically, the connecting device 4 is engaged by the carrier S4 when each hook groove 82A is engaged by the corresponding striker 8A, each slot 83 and the corresponding slot 84 are engaged by the corresponding rear striker 8B, and the strikers 8B are prevented from being disengaged from the respective slots 83 and 84 by the corresponding latch 105.

A plurality of cushion materials 119 are attached to the lower surface of a longitudinally intermediate part of the base frame 81. (See FIG. 3.) When the connecting device 4 is connected to the carrier S4, the cushion materials 119 abut the upper surface of the upper plate portion of the carrier cover 7 so that any relative movement or rattling between the connecting device 4 and the carrier S4 can be prevented.

The outer surface of a front part of the carrier cover 7 is formed with a slanted surface 7F facing in the forward and upward direction. When the lock devices 112 are disengaged from the respective rear strikers 8B and the connecting device 4 is rotated in the forward and upward direction around the front strikers 8A, the slanted surface 7F abuts lower parts of the front ends of the respective base frames 81 so that the connecting device 4 can be supported at a prescribed slanting position.

As shown in FIG. 2, a rear part of each cushion side frame member 13, 14 is provided with an upwardly projecting lower hinge member 26 which is made of sheet metal and has a major surface facing sideways.

(Seat Back)

As shown in FIG. 2, the seat back frame F2 includes a pair of back side frame members 31 and 32 extending along either side of the seat back frame F2, an upper cross frame member 33 extending between the upper ends of the back side frame members 31 and 32 and defining an upper part of the seat back S2, and a lower cross frame member 34 extending between the lower ends of the back side frame members 31 and 32. The lower ends of the back side frame members 31 and 32 extend downwardly beyond the lower cross frame member 34, and the lower end of each back side frame member 31, 32 is fitted with an upper hinge member 35, 36.

A part of the right back side frame member 32 extending between the lower end and the upper end thereof is formed by combining a left member 32A and a right member 32*b* each made of stamp formed sheet metal. The left member 32A and the right member 32*b* are both formed as channel members such that the two members oppose each other at their open ends with one of them fitted into the other.

Therefore, the right back side frame member 32 is provided with a closed cross section. The right upper hinge member 36 is made of stamp formed sheet metal, and has an upper end connected to the lower end of the right side of the right back side frame member 32. The right upper hinge member 36 extends beyond the lower end of the right back side frame member 32. The front edge and the rear edge of the right upper hinge member 36 are provided with laterally projecting flanges (projecting toward the right lower hinge member 26).

The left back side frame member 31 includes a lower left back side frame member 31A extending from a lower end of the left back side frame member 31 to an intermediate part thereof, and an upper left back side frame member 31B accounting for the remaining upper part of the left back side frame member 31. The lower left back side frame member 31A and the left upper hinge member 35 are formed by a common continuous sheet metal member having a major plane facing sideways. The front edge and the rear edge of the lower left back side frame member 31A and the left upper hinge member 35 are provided with laterally projecting flanges (projecting toward the left lower hinge member 26).

Each upper hinge member 35, 36 is rotatably connected to the corresponding lower hinge member 26 so as to jointly form a hinge having a laterally extending rotational center line X. This rotational center line X is the rotational center line of the seat back S2. The reclining mechanism R is provided between the right lower hinge member 26 and the corresponding upper hinge member 36.

The angular position of the seat back S2 relative to the seat cushion S1 (which may be referred to simply as the angular position of the seat back S2 in the following description) is defined as being in the normal position when the seat back S2 is slightly tilted rearward. When the seat back S2 is tilted forward such that the front face of the seat back S2 opposes the upper surface of the seat cushion S1, and the seat back S2 is substantially in parallel with the seat cushion S1 is defined as the folded position.

The upper left back side frame member 31B and the upper cross frame member 33 are formed by a single pipe member 37. The pipe member 37 has a lower end connected to the lower left back side frame member 31A, and extends upward so as to form the upper left back side frame member 31B. The pipe member 37 is then bent rightward so as to form the upper cross frame member 33. The lower end part of the pipe member 37 forming the upper left back side frame member 31B extends vertically, and is connected to the right side of the lower left back side frame member 31A at the left side thereof by welding. The right end part of the pipe member 37 forming the upper cross frame member 33 is laterally passed through the left member 32A and the right member 32B jointly forming the upper end part of the right back side frame member 32, and is fixedly secured to the left member 32A and the right member 32B by welding.

A pair of head rest support members 38 are attached to a central part of the front side of the upper cross frame member 33. The head rest support members 38 consist of tubular members each opening out at both ends, and extend vertically, laterally spaced from each other.

Figure 4:
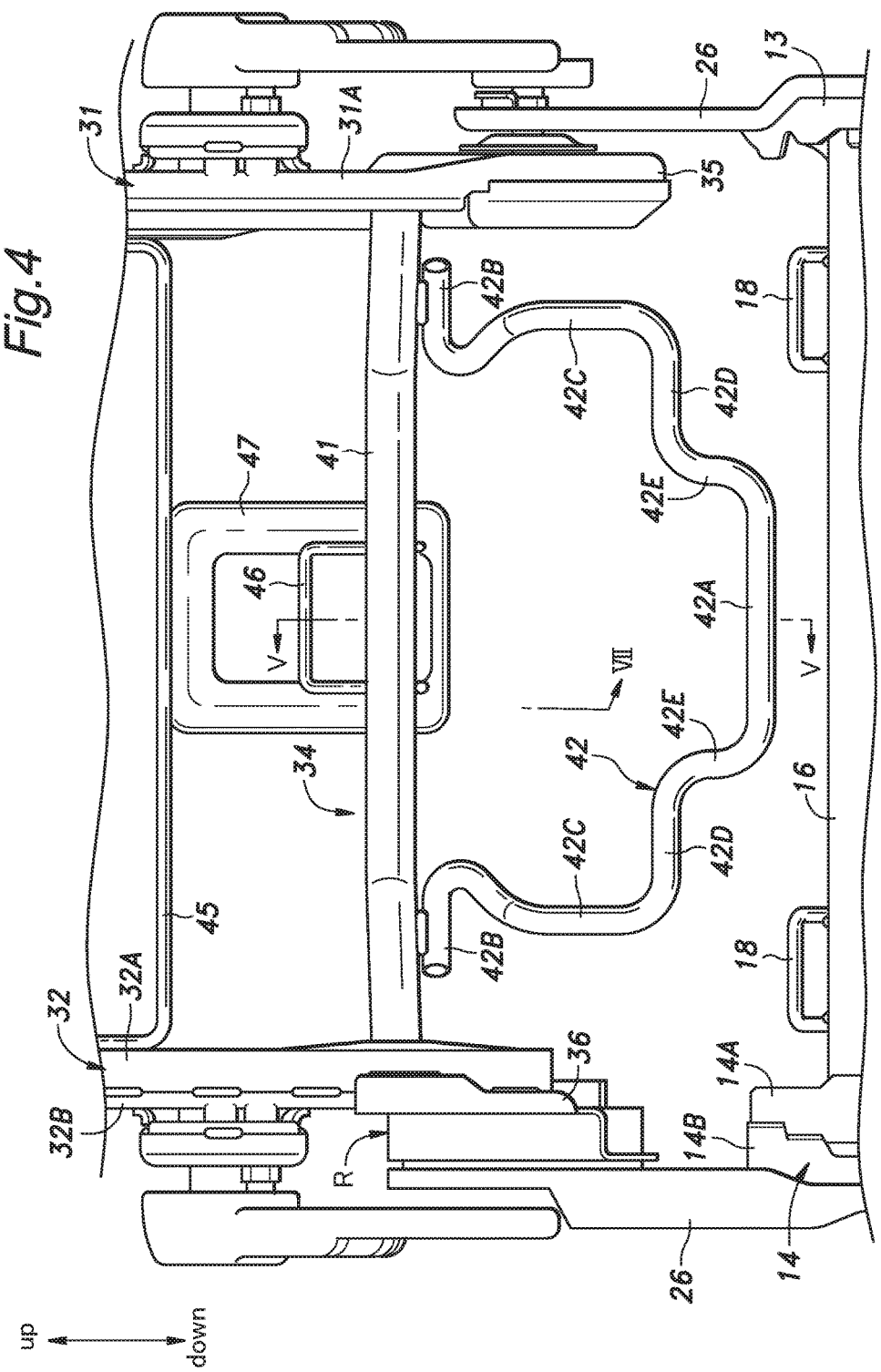
FIG. 4 is a front view of a lower part of a seat back frame.
Figure 5:
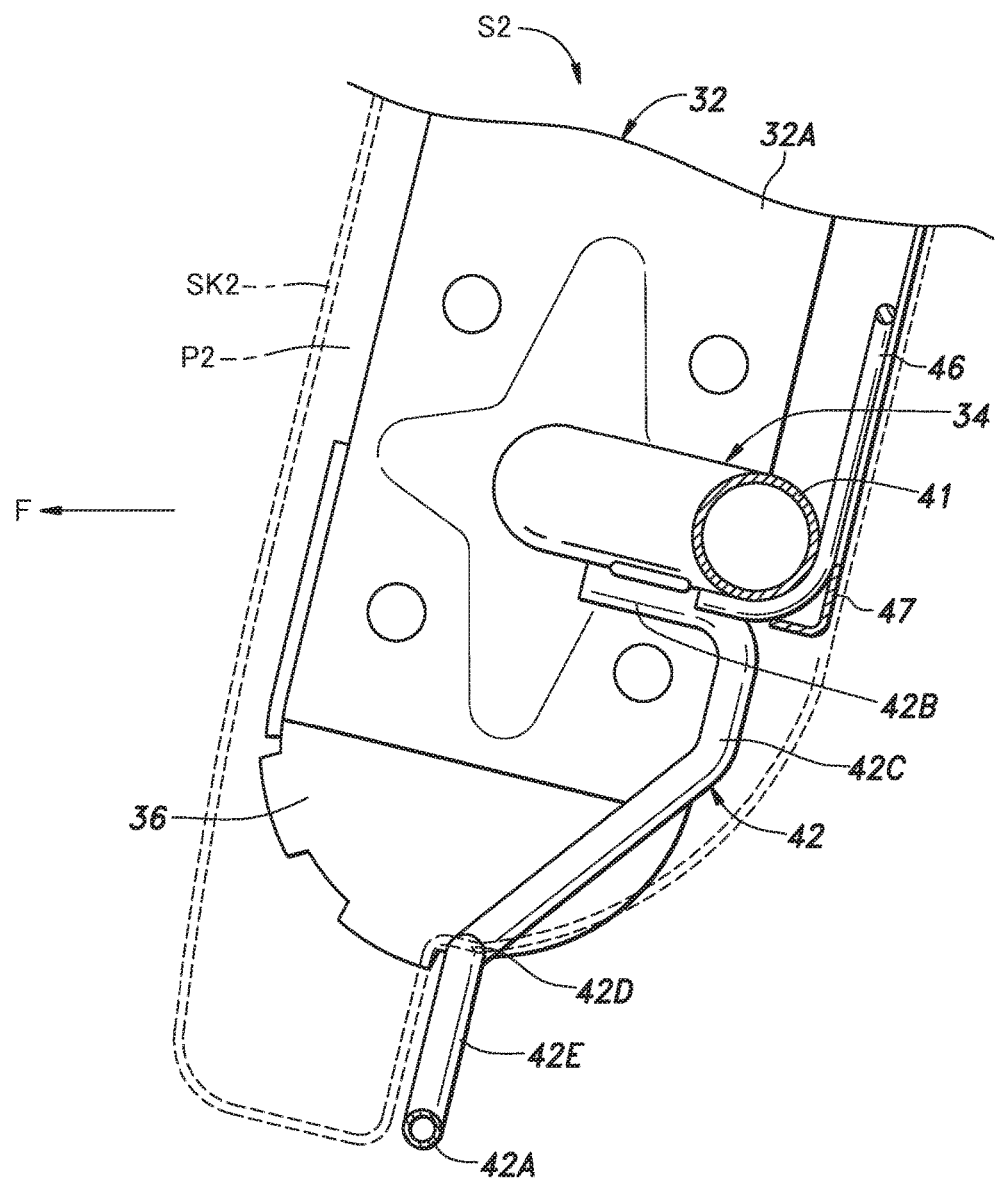
FIG. 5 is an enlarged sectional view (taken along line V-V of FIG. 4) of an upper part of the seat back frame.

As shown in FIGS. 2, 4 and 5, the lower cross frame member 34 extends laterally, and includes a connecting member 41 connected between the two back side frame members 31 and 32, and an auxiliary member 42 attached to the connecting member 41. The connecting member 41 and the auxiliary member 42 are made by bending a metallic rod or pipe members in the illustrated embodiment.

The connecting member 41 has a left end connected to the lower left back side frame member 31A and a right end connected to the right back side frame member 32. The left end of the connecting member 41 is passed laterally through the lower left back side frame member 31A, and is fixedly secured thereto by welding or the like. The right end of the connecting member 41 is passed laterally through the left member 32A of the right back side frame member 32, and is fixedly secured to the left member 32A by welding or the like. The connecting member 41 bows rearward in the central part thereof.

The auxiliary member 42 has two ends that are connected to the respective ends 42B of the connecting member 41 short of the back side frame members 31 and 32 by a small distance, and a central part that project downward so as to serve as a grip 42A. The two ends 42B of the auxiliary member 42 extend laterally along the lower sides of the respective ends 42B of the connecting member 41, and are fixedly secured to the connecting member 41 by welding. The end surfaces of the two lateral ends 42B of the auxiliary member 42 face laterally outward or face away from each other. The auxiliary member 42 further includes a pair of first vertical portions 42C that are located more inward than the respective ends 42B and are bent downward and rearward. The lower ends of the first vertical portions 42C are bent inward so as to form a pair of horizontal shoulder portions 42D, respectively, which are connected to the respective ends of the grip 42A via second vertical portions 42E, respectively. The grip 42A extends horizontally and linearly between the lower ends of the second vertical portions 42E, and is positioned laterally centrally of the seat back S2. The grip 42A is thus formed as a bent section of the auxiliary member 42.

When the seat back S2 is in the normal position, the connecting member 41 and the two ends of the auxiliary member 42 are located above the rotational center line X of the seat back S2, and the grip 42A is located so as to correspond to the two upper hinge members 35 and 36 or, in particular, below the rotational center line X of the seat back S2.

As shown in FIG. 4, the pad P2 of the seat back S2 is supported by the back side frame members 31 and 32, the upper cross frame member 33 and the lower cross frame member 34. The lower end of the pad P2 extends beyond the lower ends of the upper hinge members 35 and 36 and the rotational center line X. The auxiliary member 42 is positioned mostly behind the pad P2. The grip 42A and the second vertical portions 42E project rearward from the pad P2 and the skin member SK2 covering the pad P2, and extend downward along the outer surface of the skin member SK2 positioned on the rear side of the lower end of the pad P2. The grip 42A is positioned substantially at the same elevation as the lower end of the pad P2. The grip 42A and the second vertical portions 42E may be in contact with the outer surface of the skin member SK2 or, alternatively, may be slightly spaced from the outer surface of the skin member SK2. The two shoulder portions 42D are positioned so as to extend along the rear side of the pad P2 under the skin member SK2.

The outer profile of the lower end part of the seat back S2 is defined by the grip 42A, the second vertical portions 42E and the shoulder portions 42D positioned along the back side of the lower end part of the pad P2. Therefore, when the seat back S2 is folded onto the seat cushion S1, and a vehicle occupant holds the lower end part of the seat back S2 to lift the seat S, the load is transmitted to the back side frame members 31 an 32 via the grip 42A, the second vertical portions 42E and the shoulder portions 42D so that the pad P2 is prevented from deforming, and the vehicle occupant is enabled to lift the seat S by holding the lower end part of the seat back S2 in a comfortable manner. Also, when lifting the seat S, the grip 42A and the second vertical portions 42E project out of the skin member SK2, and are therefore readily accessible to the vehicle occupant.

Figure 6:
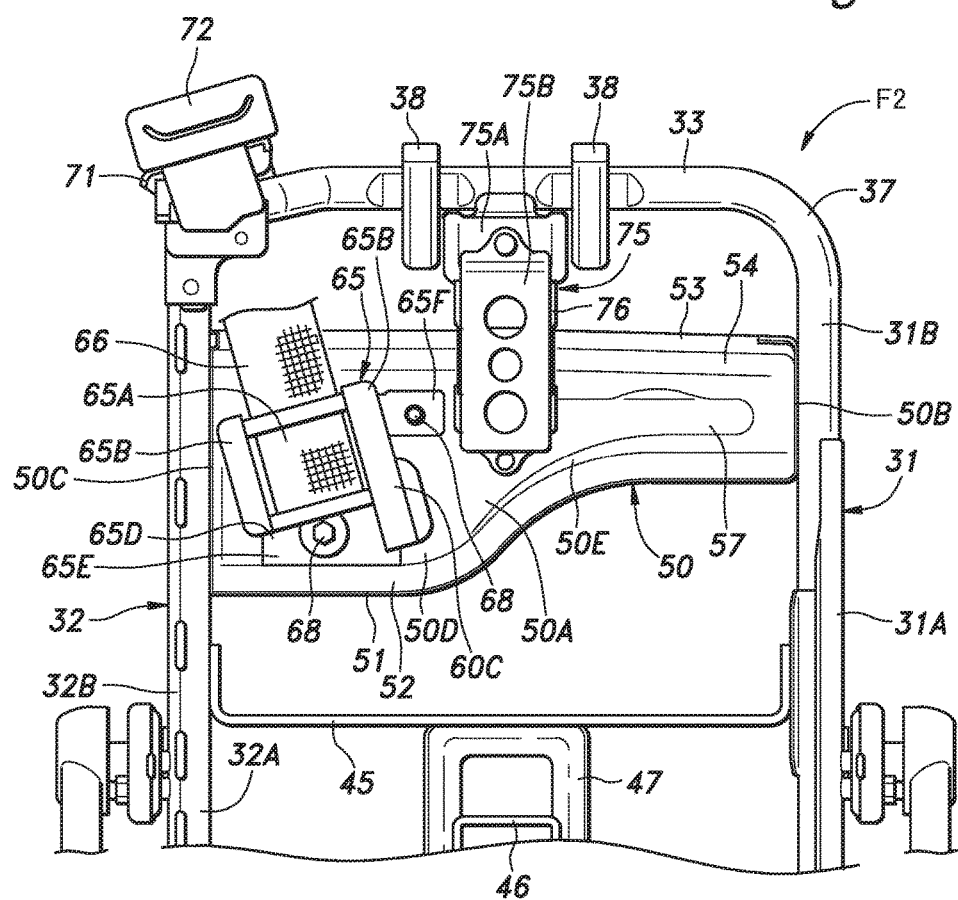
FIG. 6 is a front view of the upper part of the seat back frame.
Figure 7:
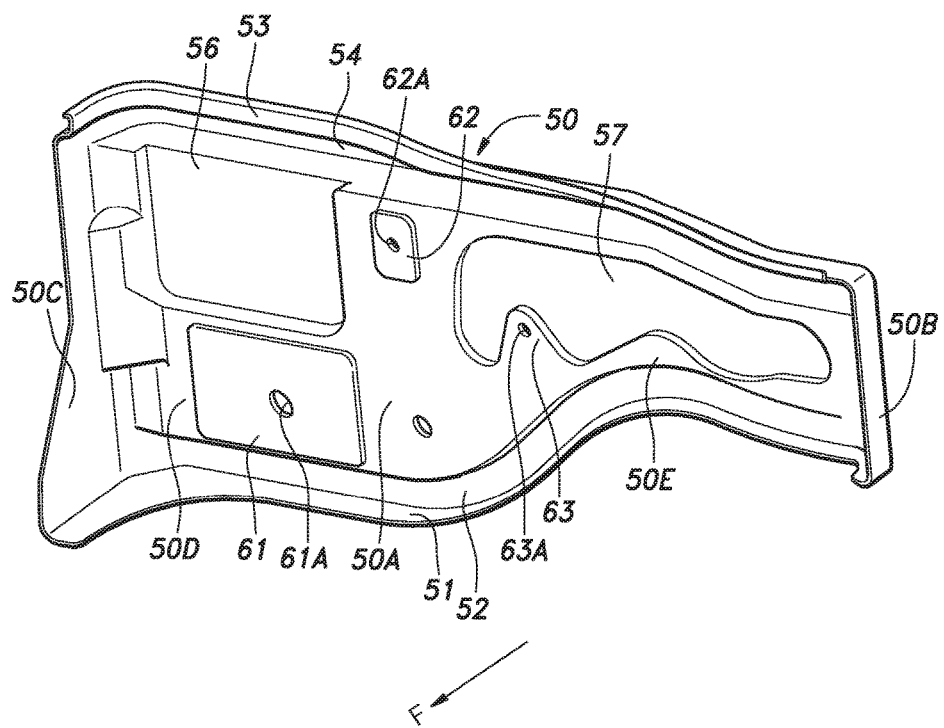
FIG. 7 is a perspective view of a bracket.

As shown in FIGS. 2, 6 and 7, a bracket 50 extends laterally between the two back side frame members 31 and 32. The bracket 50 is vertically located in the space defined between the upper cross frame member 33 and the lower cross frame member 34. The bracket 50 may be made by stamp forming sheet metal, and includes a main body 50A extending laterally, and a pair of flanges 50B and 50C formed on either side edge thereof. The main body 50A has a major plane that faces in the fore and aft direction. The two flanges 50B and 50C are bent forward from the side edges of the main body 50A, and therefore have a major planes facing sideways.

The bracket 50 has a larger vertical dimension on one side than on the other side. The wide section 50D includes one of the flanges 50C, and accounts for about one half of the main body 50A extending laterally from the flange 50C. In the illustrated embodiment, the wide section 50D is provided on the side of the bracket 50 adjoining the right back side frame member 32 having a closed cross section or on the right hand side of the bracket 50. The main body 50A has an upper edge which is generally horizontal and linear, and a lower edge which is horizontal and linear in side end parts thereof, and is curved in the center so as to smoothly connect the two horizontal and linear sections of the lower edge. The right flange 50C which has a same width as the right end part of the main body 50A has a greater width than the left flange 50B which has a same width as the left end part of the main body 50A.

The main body 50A of the bracket 50 is provided with a bend 50E in a laterally middle part thereof in such a manner that the left end part thereof is rearwardly offset relative to the right end part thereof, and the right and left end parts are parallel to each other (both have a major plane facing in the fore and aft direction).

The right flange 50C is welded to the left side of the right back side frame member 32 at the right side face thereof. The left flange 50B is welded to the right side of the upper left back side frame member 31B at the left side face thereof. The main body 50A is located more rearward than the rear sides of the right and left back side frame members 31 and 32.

As shown in FIG. 7, the lower edge of the main body 50A is formed with a lower flange 51 which extends along the lower edge of the main body 50A, and is integrally and smoothly connected to the lower ends of the right and left flanges 50B and 50C. The lower end of the main body 50A is formed with a first reinforcement bead 52 extending along the entire length of the lower edge of the main body 50A immediately inward of the lower flange 51. The first reinforcement bead 52 has a cross section having a convex side facing rearward.

The upper edge of the main body 50A is provided with a second reinforcement bead 53 having a cross section having a convex side facing forward, and a third reinforcement bead 54 having a cross section having a convex side facing rearward immediately inward of the second reinforcement bead 53. The right end of the second reinforcement bead 53 extends into the upper end of the right flange 50C.

The wide section 50D of the main body 50A is formed with a rectangular first recess 56 which is recessed rearward. The first recess 56 is formed by pressing the corresponding part of the main body 50A rearward, and has a bottom surface defined by a flat surface facing forward.

The left end part of the main body 50A is formed with an irregularly shaped second recess 57 which is recessed rearward. The second recess 57 is formed by pressing the corresponding part of the main body 50A rearward, and has a bottom surface defined by a flat surface and facing forward.

A first fastening part 61 and a second fastening part 62 each formed as a projection projecting forward are provided on the left hand side of the main body 50A and below the first recess 56, respectively. A third fastening part 63 formed as a projection projecting forward extends into the second recess 57 from below. The first to third fastening parts 61 to 63 are formed by pressing the corresponding parts of the main body 50A forward. When viewed from the rear, the first to third fastening parts 61 to 63 are recessed forward from the rear surface of the main body 50A. The first to third fastening parts 61 to 63 are formed with respective fastening holes 61A to 63A which are passed through the material of the main body 50A in the thickness wise direction.

As shown in FIGS. 2 and 6, a retractor 65 for winding an end of a seat belt 66 is attached to the front face of the wide section 50D of the main body 50A. The retractor 65 may have a per se known structure, and includes a drum 65A for winding the seat belt 66, a housing 65C having a pair of side walls 65B rotatably supporting the drum 65A, and a mounting member 65D supporting the housing 65C. The housing 65C is provided with a lock mechanism (not shown in the drawings) for restricting the rotation of the drum 65A by detecting the rotational speed of the drum 65A and the acceleration acting on the retractor 65.

The mounting member 65D includes a first and second fastening piece 65E and 65F each consisting of a plate member. The first and second fastening pieces 65E and 65F are each formed with a fastening hole (not shown in the drawings) passed through the thickness of the corresponding fastening piece. The first and second fastening pieces 65E and 65F are positioned so as to align with the front faces of the first and second fastening parts 61 and 62, and are secured to the respective fastening parts by threaded bolts passed through the respective fastening holes. The retractor 65 is attached to the bracket 50 with threaded bolts 68. When the retractor 65 is attached to the bracket 50, a part of the rear end of the retractor 65 is received in the first recess 56.

As shown in FIGS. 2 and 6, the upper end part of the right back side frame member 32 is fitted with a belt guide 72 via a belt guide bracket 71. The belt guide 72 is made of stamp formed sheet metal, and is formed with a guide hole passed through the thickness thereof.

The seat belt 66 which is drawn from the retractor 65 extends upward along the front side of the bracket 50, passes along the rear side of the upper cross frame member 33, and is passed through the belt guide 72 from the rear to the front. As shown in FIG. 1, the free end of the seat belt 66 which is drawn forward from the belt guide 72 is connected to the right cushion side frame member 14. An intermediate part of the seat belt 66 is fitted with a tongue plate (not shown in the drawings) which is configured to be detachably engaged by a buckle (not shown in the drawings) provided on the left cushion side frame member 13.

Figure 19:
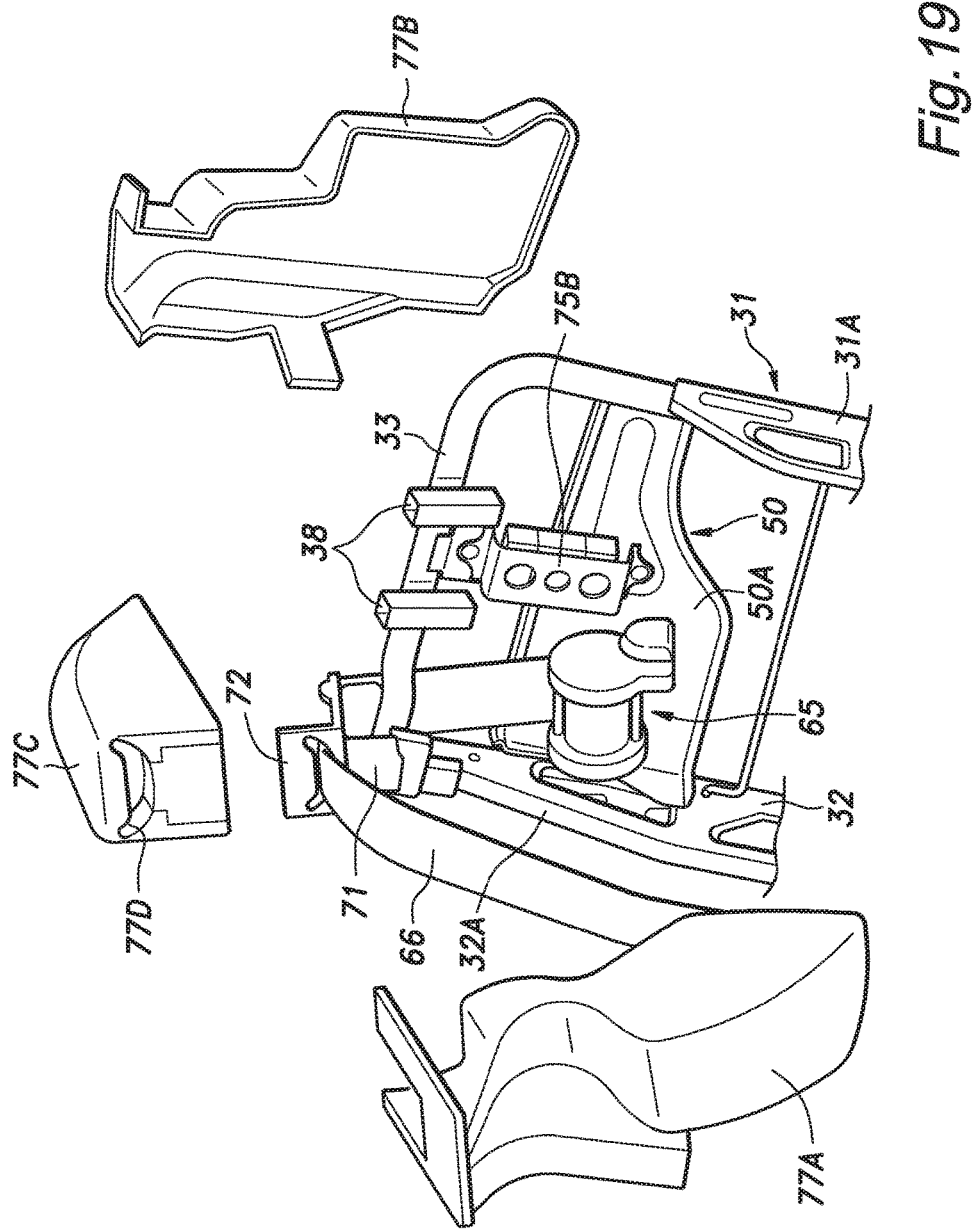
FIG. 19 is an exploded perspective view of an upper part of the seat back frame.

As shown in FIG. 19, the retractor 65, the right half of the bracket 50, an upper part of the right back side frame member 32, the belt guide bracket 71, and the part of the seat belt 66 extending from the retractor 65 to the belt guide 72 are covered by a front protective cover 77A from the front and a rear protective cover 77B from the rear. The belt guide 72 is covered by an upper protective cover 77C shaped like a cup with an open end facing downward and having a belt slot 77D for passing through the seat belt 66, and the belt guide 72. The front protective cover 77A, the rear protective cover 77B and the upper protective cover 77C are made of plastic material, and are joined to one another. The upper protective cover 77C is positioned above the skin member SK2, and the front protective cover 77A and the rear protective cover 77B are mostly positioned inside the skin member SK2. The front end of the front protective cover 77A is covered by the pad P2.

As shown in FIGS. 2 and 6, the upper cross frame member 33 and the bracket 50 are connected to each other via a connecting member 75 extending vertically. The connecting member 75 is connected to the laterally central parts of the upper cross frame member 33 and the bracket 50 at the respective upper and lower ends thereof. The connecting member 75 includes a first and second connecting members 75A and 75B which are made of stamp formed sheet metal, and are connected to each other.

The first connecting member 75A is connected to a central part of the upper cross frame member 33 located between the two head rest support members 38 by welding, and extends downward from the upper cross frame member 33. The second connecting member 75B has a major plane facing in the fore and aft direction, and is attached to the first connecting member 75A at the upper end thereof and to the third fastening part 63 of the bracket 50 at the lower end thereof. A vertically intermediate part of the second connecting member 75B is formed with a device receiving portion 75C which projects forward in a stepwise fashion and is therefore recessed forward when viewed from behind.

The device receiving portion 75C of the second connecting member 75B supports a device associated with the seat S such as a dynamic damper, an electric motor, an electronic control unit and a drive unit for the head rest S3. In the illustrated embodiment, a dynamic damper 76 is supported by the second connecting member 75B. The dynamic damper 76 includes a rectangular casing and a mass supported by a spring inside the casing, and may be connected to the second connecting member 75B by using screws and fastening bands.

(Second Tether Anchor)

As shown in FIGS. 2, 4 and 5, the two back side frame members 31 and 32 are connected to each other by a laterally extending connecting member 45 which is vertically situated between the bracket 50 and the connecting member 41. The connecting member 45 may consist of a metallic rod, for instance. An inverted U-shaped second tether anchor 46 is fixedly attached to a laterally central part of the connecting member 41 at the two leg parts thereof such that the second tether anchor 46 extends vertically upward from the connecting member 41 and a laterally extending section thereof is positioned at the upper end thereof. The second tether anchor 46 is made of metallic rod member bent into the prescribed shape. A rectangular frame member 47 having a major plane facing in the fore and aft direction is attached to the connecting member 45 at the upper end thereof and to the connecting member 41 at the lower end thereof such that the frame member 47 is laid over the two leg parts of the second tether anchor 46 from behind, and the laterally extending section of the second tether anchor 46 is exposed in the central opening of the rectangular frame member 47. The frame member 47 is covered by the skin member SK2, and the laterally extending section of the second tether anchor 46 is positioned outside of the skin member SK2 so as to be accessible and visible from the rear. The rear surface of the skin member SK2 covering the frame member 47 is fitted with a plastic trim member (not shown in the drawings) to enhance the external appearance of the area surrounding the second tether anchor 46.

(Walk Out Lever)

As shown in FIG. 2, a rear end part of one of the cushion side frame members 13 is fitted with a walk out lever 130 that can be tilted between an initial position and an operation position. The walk out lever 130 is biased by a biasing member not shown in the drawings toward the initial position. A strap 130A is connected to the walk out lever 130 so that the walk out lever 130 may be tilted to the operation position against the biasing force of the biasing member by pulling the strap 130A to the rear. The walk out lever 130 is connected to an end of a control cable (not shown in the drawings) connected to the reclining mechanism R and an end of a control cable (not shown in the drawings) connected to the rail lock device 3C of the second rail device 3 so that the reclining mechanism R and the rail lock device 3C can be released at the same time to enable the user to fold the seat back S2 forward and to allow the upper rail 2B of the second rail device 3 to move forward relative to the lower rail 2A thereof by tilting the walk out lever 130 to the operation position.

Figure 20:
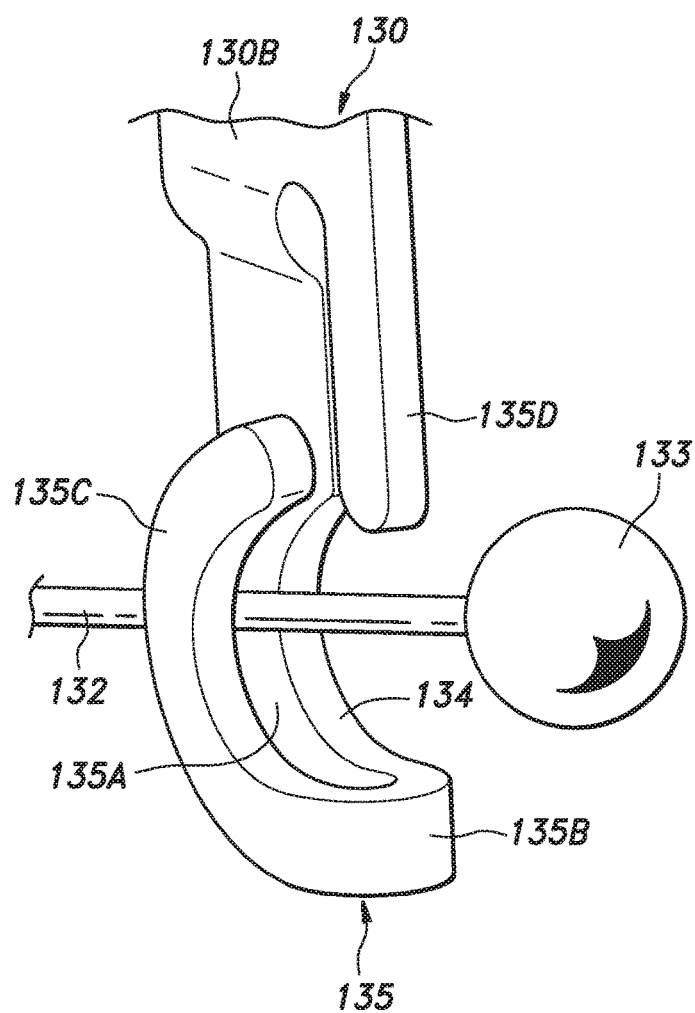
FIG. 20 is a perspective view of a walk out lever.

As shown in FIG. 20, the walk out lever 130 is made of stamp formed sheet metal, and is provided with an engagement portion 134 for engaging a ball 133 attached to an end of an inner cable 132 of a control cable. The engagement portion 134 includes a projecting piece 135 consisting of an elongated plate member projecting from a main body 130B of the walk out lever 130. The projecting piece 135 includes a base portion 135A extending from the main body 130A, and a doubled back portion 135C which is bent from the free end of the base portion 139A at a bent portion 135B in the manner of a hairpin. The base portion 135A and the doubled back portion 135C extend in parallel with each other in a spaced apart relationship. The space between the base portion 135A and the doubled back portion 135C is narrower than the outer diameter of the ball 133, but is greater than the outer diameter of the inner cable 132. The base portion 135A and the doubled back portion 130C extend in an arcuate fashion so that when the inner cable 132 is passed into the space between the base portion 135A and the doubled back portion 130C, and is pulled, the ball 133 is engaged by the concave surface jointly defined by the base portion 135A and the doubled back portion 135C. When the walk out lever 130 is tilted from the initial position to the operation position, the ball 133 is engaged by the base portion 135A and the doubled back portion 135C, and a tension is applied to the inner cable 132.

The main body 130B is further provided with a restriction piece 135D extending along the edge of the base portion 135A facing the ball 133. The base end of restriction piece 135D is connected to the main body 130B, and the free end of the restriction piece 135D is positioned inside of a hypothetical circle defined by the inner peripheral edge of the curved base portion 135A. Thus, the restriction piece 135D is separated from the main body 130B by a vertically extending narrow slot. The restriction piece 135D restricts the movement of the ball 133 to come near the free end (upper end) of the doubled back portion 135C. Alternatively, the restriction piece 135D may be formed integrally with the base portion 135A. In this case, the inner peripheral edge of the base portion 135A protrudes more downward than the free end of the doubled back portion 135C as seen in FIG. 20.

The mode of operation of the seat S is described in the following. The grip 42A that can be used for lifting the seat S is positioned in the lower part of the seat back S2 and, in particular, along the outer surface of the lower part of the seat back S2 so that when the seat back S2 is in the normal position, the grip 42A is positioned under the seat back S2, and is prevented from protruding rearward. Once the seat back S2 is folded onto the seat cushion S1 or tilted forward, the grip 42A is directed rearward along with the lower end of the seat back S2 so that the grip 42A is readily accessible for the vehicle occupant or the user. When the seat back S2 is in the normal position, the grip 42A is prevented from projecting rearward, and interfering with the legs of the vehicle occupant seated behind the seat S. As the grip 42A is formed in the auxiliary member 42 forming a part of the seat back frame F2, the grip 42A may be given with a high stiffness.

Because the grip 42A is formed by using the lower cross frame member 34, the grip 42A can be positioned in the lower end part of the seat back S2 by using a highly simple structure, and a high stiffness can be given to the grip 42A. As the lower cross frame member 34 is formed by the connecting member 41 and the auxiliary member 42, and the grip 42A is provided on the auxiliary member 42, the shape and the position of the grip 42A can be modified without any difficulty. As the seat back frame F2 can be given with an adequate stiffness by the connecting member 41, the shapes of the auxiliary member 42 and the grip 42A can be feely selected.

The auxiliary member 42 can be made of a metallic rod or pipe member, and the grip 42A can be added to the auxiliary member 42 without any difficulty. Because the grip 42A includes a laterally extending linear part, the grip 42A can be given with an adequate width so that the user can directly get hold of the grip 42A without any effort.

Because the grip 42A is provided in the laterally central part of the seat back S2, the seat S remains stable when the vehicle occupant grabs and lifts the grip 42A.

In the illustrated embodiment, because the grip 42A projects out of the skin member Sk2 of the seat back S2, the vehicle occupant is able to grab the grip 42A directly.

Because the shoulder portions 42D located on either side of the grip 42A are located inside the skin member SK2, the pad P2 can be supported by the shoulder portions 42D so that the pad P2 is prevented from deforming even when a loading is applied to the grip 42A. The vehicle occupant is also able to lift the seat S by grabbing the lower end part of the seat back S2, instead of directly grabbing the grip 42A. The grip 42A and the second vertical portions 42E also support the pad P2 from outside so that the pad P2 is prevented from deforming even when a loading is applied to the grip 42A.

In the illustrated embodiment, because the grip 42A is positioned lower than the rotational center line X of the seat back S2, when the seat back S2 is folded onto the seat cushion S1 or tilted forward, the grip 42A moves rearward so that the grip 42A can be readily grabbed by the vehicle occupant, and the convenience for the vehicle occupant can be enhanced.

The stiffness of the bracket 50 is enhanced, and prevented from deforming because the two ends of the bracket 50 are connected to the back side frame members 31 and 32 at the respective lateral ends thereof. The stiffness of the seat back frame F2 including the two back side frame members 31 and 32 is increased by the presence of the bracket 50. The bracket 50 is provided with the wide section 50D extending from the flange 50C to the main body 50A on the right hand side thereof. Owing to the presence of the wide section 50D, the right flange 50C is connected to the right back side frame member 32 over a larger vertical range than the left flange 50B is connected to the left back side frame member 31 so that the right hand side of the bracket 50 where the wide section 50D is formed is given with a higher stiffness than the left hand side of the bracket 50. The retractor 65 is attached to the right hand side part of the bracket 50 having a higher stiffness. Therefore, the deformation of the bracket 50 is avoided even placed under substantial stress so that the position and the orientation of the retractor 65 can be maintained in a stable manner.

The right back side frame member 32 is provided with a closed cross section, and has a higher stiffness than the left back side frame member 31. Because the wide section 50D is provided in the part of the bracket 50 adjoining the right back side frame member 32 or the right end part of the bracket 50, the stiffness of the right end part of the bracket 50 can be increased. Therefore, the bracket 50 is enabled to support the retractor 65 in a highly stiff manner. Also, because the distance between the retractor 65 and the belt guide 72 can be reduced, the necessary length of the seat belt 66 can be minimized, and the size of the retractor 65 can be minimized as a result.

Because the flanges 50B and 50C provided on the lateral ends of the bracket 50 are bent forward with respect to the main body 50A, and are attached to the respective back side frame members 31 and 32, the main body 50A can be positioned in a rear side part of the seat back S2, and in particular more rearward than the rear sides of the back side frame members 31 and 32. Therefore, the retractor 65 can be positioned in a relatively rear part in the seat back S2 so that the distance between the retractor 65 and the front surface of the seat back S2 can be maximized. As a result, the retractor 65 is prevented from causing discomfort to the backside of the vehicle occupant seated in the seat.

The bracket 50 is provided with a bend 50E in the laterally intermediate part thereof in such a manner that the right end part provided with the wide section 50D is located more rearward than the left end part of the bracket 50. As a result, the retractor 65 can be positioned in a relatively rear part of the seat back S2.

The wide section 50D is formed with the first recess 56 so that a part of the retractor 65 may be placed within the first recess 56. Therefore, the retractor 65 can be positioned in a relatively rear part of the seat back S2.

The bracket 50 is given with a three dimensional shape owing to the presence of the lower flange 51 and the first to third reinforcement beads 52 to 54, and is therefore given with a high stiffness.

The bracket 50 is connected to the upper cross frame member 33 via the connecting member 75, and is therefore given with a high stiffness. In particular, because the bracket 50 is connected to the upper cross frame member 33 at the central part of the bracket 50 which is furthest from the two back side frame members 31 and 32, the deformation of the bracket 50 can be avoided in an efficient manner.

The second connecting member 75B forming the connecting member 75 is formed with a device receiving portion 75C which is configured to receive a device. The device receiving portion 75C may be used for accommodating a dynamic damper 76 which is required to be mounted in an upper part of the seat back S2.

Because the rear end part of the vehicle occupant support member 20 is provided with an engagement claw 23B (engagement portion) engaging the tether anchor 17, the position of the vehicle occupant support member 20 relative to the rear cross frame member 16 can be stabilized. By positively determining the position of the rear end of the vehicle occupant support member 20, the position of the front end part of the vehicle occupant support member 20 relative to the front cross frame member 15 can be prevented from shifting. Because the engagement claws 23B clamp the legs 17A of the tether anchor 17 from both sides, the lateral position of the rear hook member 23 relative to the rear cross frame member 16 can be positively determined.

Because the vehicle occupant support member 20 includes the front hook member 22 and the rear hook member 23 for supporting the front ends and the rear ends of the spring members 21, respectively, the connecting points of the vehicle occupant support member 20 to the front cross frame member 15 and the rear cross frame member 16 can be minimized so that the structure for connecting the vehicle occupant support member 20 to the front cross frame member 15 and the rear cross frame member 16 can be simplified. As a result, the assembly work for attaching the vehicle occupant support member 20 to the front cross frame member 15 and the rear cross frame member 16 can be simplified. Because the vehicle occupant support member 20 is engaged by the front cross frame member 15 via the front hook member 22 which is wrapped around the front cross frame member 15, and the rear cross frame member 16 via the rear hook member 23 which is wrapped around the rear cross frame member 16, the assembly work for attaching the vehicle occupant support member 20 to the seat cushion frame F1 can be simplified.

Because the two legs 17A of the tether anchor 17 extend from the lower part of the rear cross frame member 16 rearward, the rear hook member 23 can be engaged by the upper and rear side of the rear cross frame member 16. Also, as the engagement claws 23B extend downward from the rear edge of the rear hook member 23, the engagement claws 23B can engage the respective ends of the tether anchor 17. As the free end of each engagement claw 23B is provided with a projection 23C in the free end thereof, the engagement claws 23B can be securely engaged by the two legs 17A of the tether anchor 17, and the circumferential (for and aft) position of the rear hook member 23 relative to the rear cross frame member 16 can be stabilized.

When the seat cushion frame F1 is moved relative to the floor owing to the inertia force acting upon the seat S at the time of a vehicle crash, the upper hook portion 115A and the lower hook portion 89B of the cover plate 89 become engaged with each other so that the rail device 3 is protected from external loading, and the deformation of the rail device 3 can be avoided. Also, the lock device 112 is prevented from deforming by being restrained by the upper hook member 115. As the upper hook portion 115A and the lower hook portion 89B oppose each other at a certain gap in normal condition, no friction is caused between the upper hook portion 115A and the lower hook portion 89B as the rail device 3 performs the sliding action.

The upper hook member 115 and the cover plate 89 are made of stamp formed sheet metal, and the upper hook portion 115A and the lower hook portion 89B extend in the fore and aft direction so that the stiffness of the upper hook portion 115A and the lower hook portion 89B can be improved. When the upper hook portion 115A and the lower hook portion 89B move relative to each other in the fore and aft direction, the upper hook portion 115A and the lower hook portion 89B can remain opposed to each other. As upper hook portion 115A and the lower hook portion 89B are shaped like letter J in cross sectional view, the upper hook portion 115A and the lower hook portion 89B are prevented from touching each other as the upper hook portion 115A and the lower hook portion 89B move relative to each other in the fore and aft direction. The cover plate 89 is not directly connected to the lower rail 3A, but when extreme load is applied to the seat S, the cover plate 89 is connected to the upper rail 3B and the cushion side frame members 13 and 14 via the upper hook member 115.

As the front end 89A of the cover plate 89 is passed through the first insertion hole 85E, the front end 89A of the cover plate 89 is positioned by the first insertion hole 85E so that the position of the cover plate 89 relative to the side wall 85A is stabilized. As the front end 89A of the cover plate 89 that is passed through the first insertion hole 85E supports the outer casing 108A of the control cable 108, the need for adding an engagement feature for supporting the outer casing 108A to the side wall 85A is eliminated.

The foregoing embodiment may be modified in various ways. For instance, the auxiliary member 42 of the foregoing embodiment is only exemplary, and can be modified in various ways. For instance, the grip 42A and the second vertical portions 42E were exposed out of the skin member SK2 in the foregoing embodiment, but may also be positioned inside the skin member SK2 without departing from the scope of the present invention. In this case, the grip 42A and the second vertical portions 42E may be positioned along the rear surface of the pad P2.

Figure 8:
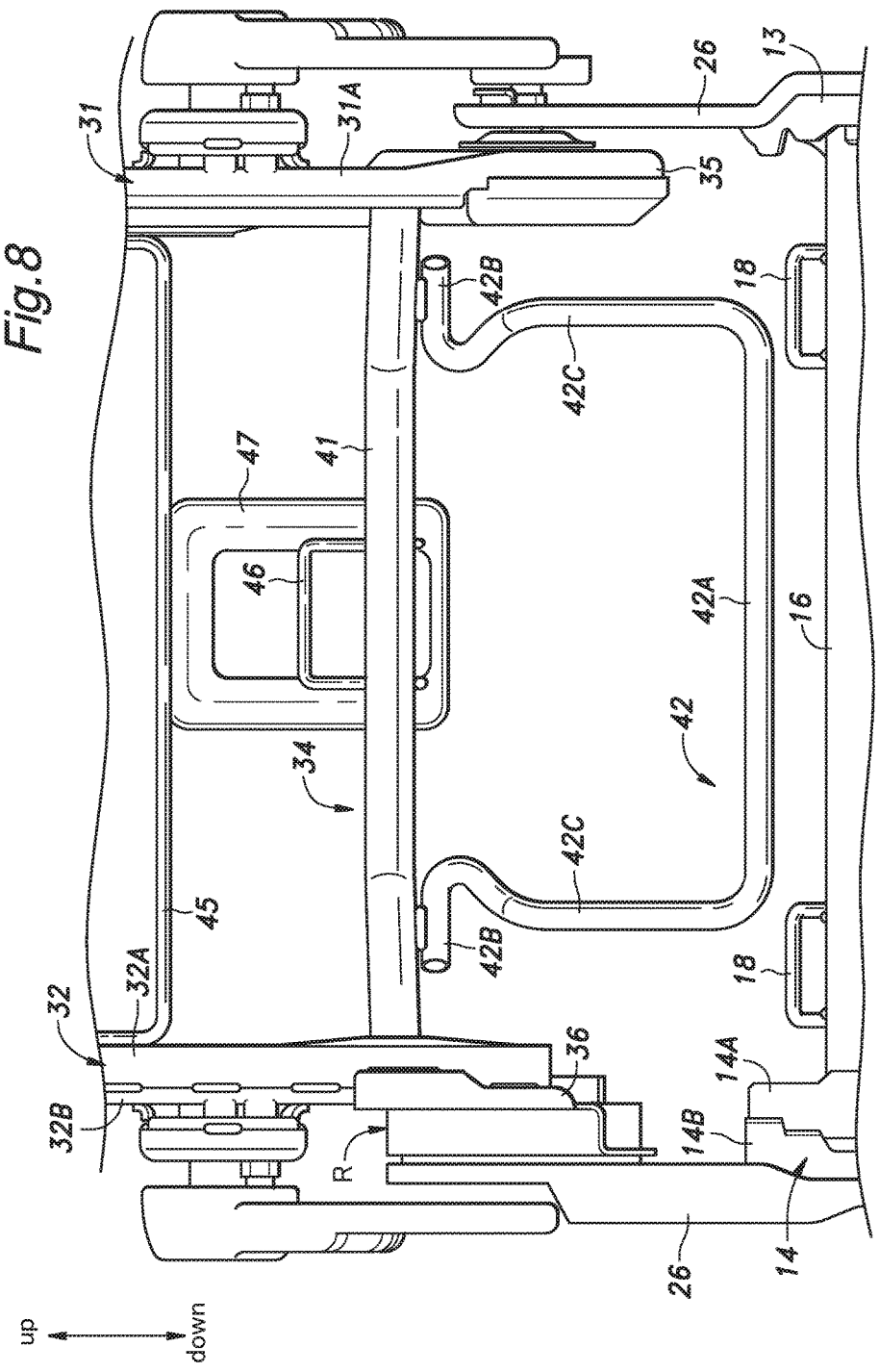
FIG. 8 is an enlarged front view of a lower part of a seat back frame of a modified embodiment.

As shown in FIG. 8, the shoulder portions 42D and the second vertical portions 42E may be omitted from the auxiliary member 42. In this case, the length of the first vertical portions 42C may be adjusted such that the grip 42A is located adjacent to the lower end of the seat back S2. In this case also, the grip 42A is thus formed as a bent section of the auxiliary member 42.

Figure 9:
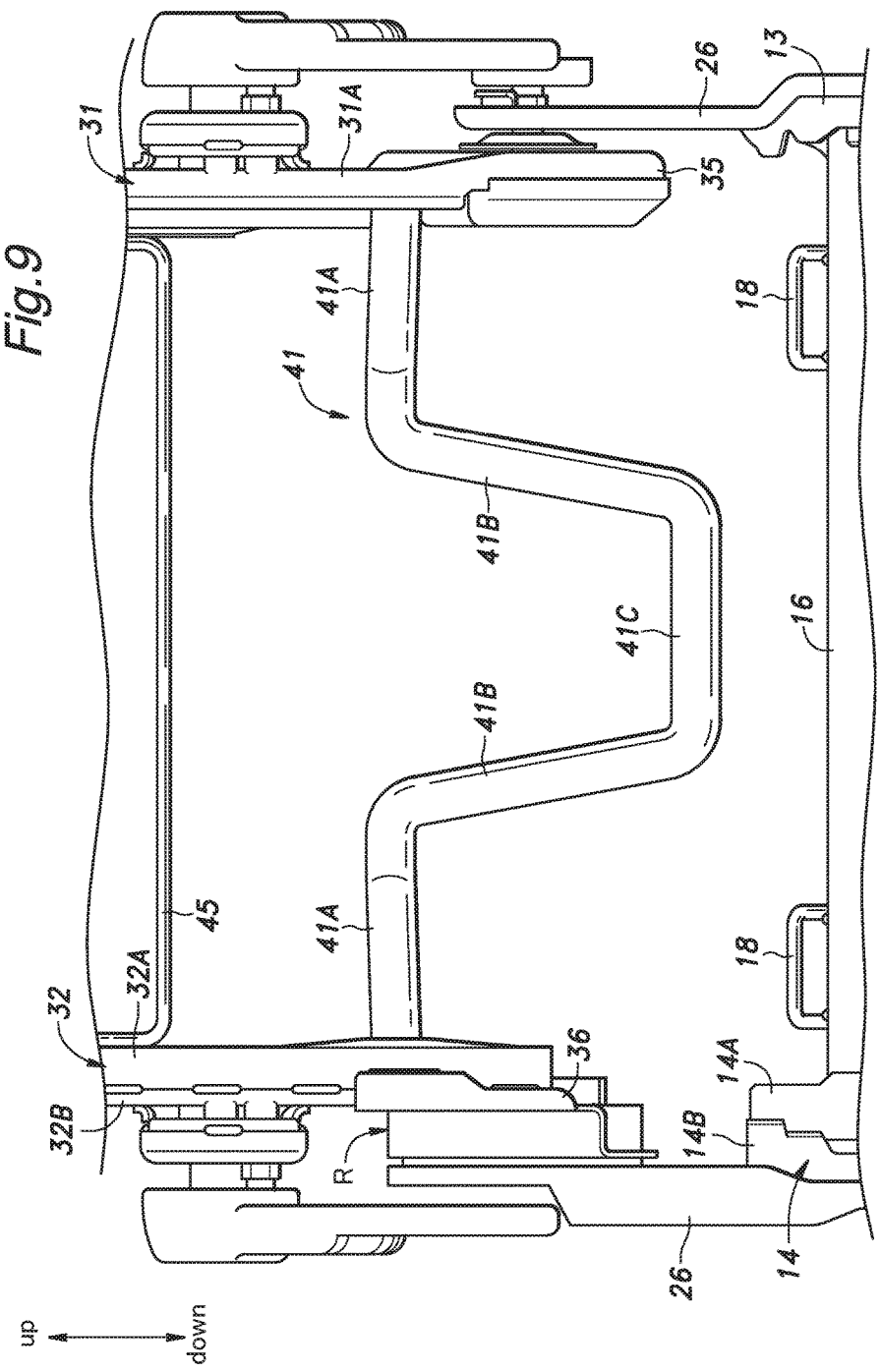
FIG. 9 is an enlarged front view of a lower part of a seat back frame of another modified embodiment.

Also, as shown in FIG. 9, the auxiliary member 42 may be omitted altogether by providing a grip in the connecting member 41. In this case, the connecting member 41 includes a pair of end portions 41A extending horizontally and connected to the respective back side frame members 31 and 32, a pair of vertical portions 41B extending downward from the inner ends of the respective end portions 41A and a grip 41C extending between the lower ends of the respective vertical portions 41B. The grip 41C and the vertical portions 41B may be positioned along the back side of the lower end of the pad P2, either outside or inside of the skin member SK2. In this case, the grip 41C is thus formed as a bent section of the connecting member 41.

Although the present invention has been described in terms of preferred embodiments thereof, it is obvious to a person skilled in the art that various alterations and modifications are possible without departing from the scope of the present invention which is set forth in the appended claims.

The invention claimed is:

1. A vehicle seat, comprising:
 a seat cushion including a seat cushion frame, the seat cushion frame including a pair of side frame members extending along either side of the seat cushion;
 a seat back attached to a rear part of the seat cushion;
 a slide rail device including a pair of upper rails extending in a fore and aft direction and attached to the respective side frame members and a pair of lower rails slidably supporting the respective upper rails; and
 a pair of lock devices secured to the lower rails for detachably engaging the respective lower rails to corresponding strikers secured to a vehicle floor-side member;

the vehicle seat further comprising at least one upper hook member depending from one of the upper rails or one of the side frame members, and at least one lower hook member extending upward from a part of the corresponding lock device or a member securing the lock device to the corresponding lower rail such that the upper and lower hook members are spaced apart from each other, but jointly prevent an upward movement of the upper rail away from the lower rail.

2. The vehicle seat according to claim 1, wherein the upper hook member and the lower hook member are each made of sheet metal, and extend in a fore and aft direction.

3. The vehicle seat according to claim 2, wherein each lock device comprises a side wall member which is attached to a lower part of the corresponding lower rail so as to extend downward and provided with a first slot in a lower edge thereof, a cover plate attached to the side wall member via a spacer so as to oppose the side wall member and provided with a second slot opposite to the first slot, and a latch rotatably supported between the side wall member and the cover plate so as to engage the striker when the striker has advanced into the first slot and the second slot, the lower hook member being formed in an upper edge of the cover plate.

4. The vehicle seat according to claim 3, wherein the cover plate is connected to the side wall member in at least two points ahead and behind the first slot, respectively, via the spacer.

5. The vehicle seat according to claim 3, wherein the side wall member is provided with a through hole, and a free end of the cover plate is bent from a remaining part thereof to be passed into the through hole.

6. The vehicle seat according to claim 5, wherein the free end of the cover plate which is passed into the through hole engages an outer casing of a control cable for operating the latch.

7. The vehicle seat according to claim 1, wherein the upper hook member and the lower hook member are J-shaped as seen from front.

8. The vehicle seat according to claim 1, wherein the upper end of the upper hook member is interposed between the side frame member and the upper rail.

* * * * *